United States Patent
Raithatha et al.

(10) Patent No.: US 11,817,785 B2
(45) Date of Patent: Nov. 14, 2023

(54) DEVICE AND METHOD FOR CONTROLLING OUTPUT VOLTAGE OF A DIGITAL-TO-ANALOG CONVERTER

(71) Applicant: Renesas Electronics America Inc., Milpitas, CA (US)

(72) Inventors: Vipul Raithatha, Northampton (GB); Rob Cox, Abington (GB); Allan Warrington, Rochester (GB); Vinod Aravindakshan Lalithambika, Girton (GB); Michael Jason Houston, Cary, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 113 days.

(21) Appl. No.: 17/084,070

(22) Filed: Oct. 29, 2020

(65) Prior Publication Data

US 2021/0135679 A1    May 6, 2021

Related U.S. Application Data

(60) Provisional application No. 62/928,677, filed on Oct. 31, 2019.

(51) Int. Cl.
*H02M 3/158* (2006.01)
*H02M 3/157* (2006.01)
*H02M 1/00* (2006.01)

(52) U.S. Cl.
CPC ......... *H02M 3/1582* (2013.01); *H02M 3/157* (2013.01); *H02M 1/0025* (2021.05)

(58) Field of Classification Search
CPC .................................................. H02M 1/0025
See application file for complete search history.

(56) References Cited

U.S. PATENT DOCUMENTS

| | | | |
|---|---|---|---|
| 8,120,345 B2* | 2/2012 | Akiyama | H02M 3/156 323/283 |
| 9,843,330 B1* | 12/2017 | Attah | H02M 3/157 |
| 10,019,021 B1* | 7/2018 | Lee | H02M 3/158 |
| 2005/0220240 A1* | 10/2005 | Lesso | G06F 5/06 375/372 |
| 2009/0256541 A1* | 10/2009 | Akyildiz | G06F 1/26 323/283 |
| 2009/0309563 A1* | 12/2009 | Noda | H02M 3/158 323/282 |
| 2012/0032728 A1* | 2/2012 | Coleman | H02M 3/158 327/434 |
| 2013/0063101 A1* | 3/2013 | Nene | H03K 4/026 341/131 |
| 2013/0113450 A1* | 5/2013 | Tang | H02M 1/00 323/283 |

(Continued)

*Primary Examiner* — Gustavo A Rosario-Benitez
(74) *Attorney, Agent, or Firm* — Foley & Lardner LLP

(57) ABSTRACT

DAC control logic for controlling a DAC for supplying a target voltage VTARGET to a switching converter is disclosed. The DAC logic comprises control logic which is configured, in response to DAC ramp-down, to decrement DAC input code supplied to the DAC in a series of steps. The DAC control logic is configured, for at least some of the steps during ramp down, to wait until at least one switching cycle has occurred in the switching converter before decrementing the DAC input code from a current value to a new value.

9 Claims, 18 Drawing Sheets

(56) References Cited

U.S. PATENT DOCUMENTS

| | | | | |
|---|---|---|---|---|
| 2013/0265180 | A1* | 10/2013 | Matsumoto | H03M 1/46 341/110 |
| 2014/0043175 | A1* | 2/2014 | Fogleman | H03M 1/069 341/110 |
| 2014/0176102 | A1* | 6/2014 | Tang | H03M 1/38 323/283 |
| 2014/0246908 | A1* | 9/2014 | Chew | H04Q 9/00 307/31 |
| 2014/0333459 | A1* | 11/2014 | Oshima | H03M 1/12 341/120 |
| 2015/0117126 | A1* | 4/2015 | Higuchi | G11C 7/22 365/191 |
| 2015/0311795 | A1* | 10/2015 | Yang | H02M 3/156 323/271 |
| 2016/0132084 | A1* | 5/2016 | Solki | H02M 3/157 713/320 |
| 2017/0235359 | A1* | 8/2017 | de Nie | H02M 3/33523 713/310 |
| 2018/0152103 | A1* | 5/2018 | Mansri | H02M 3/157 |
| 2020/0185041 | A1* | 6/2020 | Baek | G11C 5/145 |

* cited by examiner

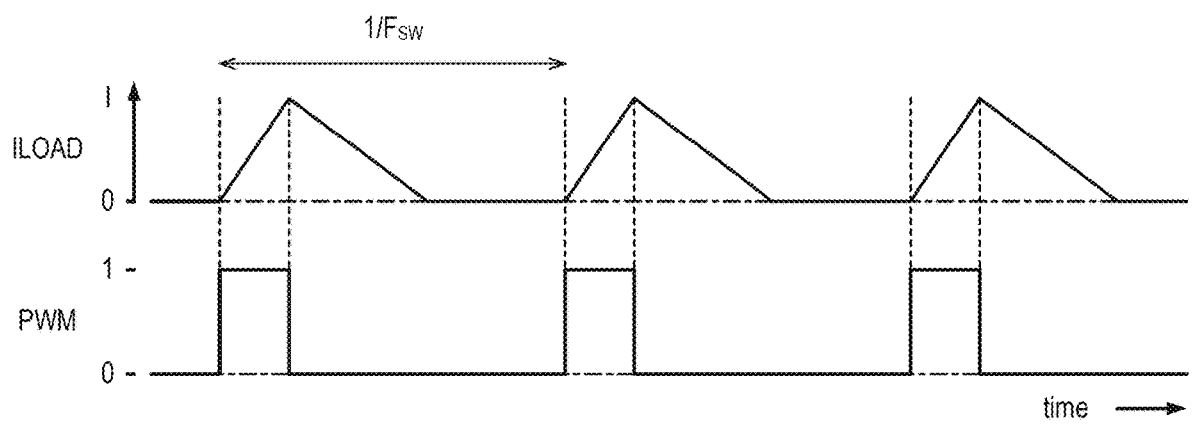
Fig. 7A
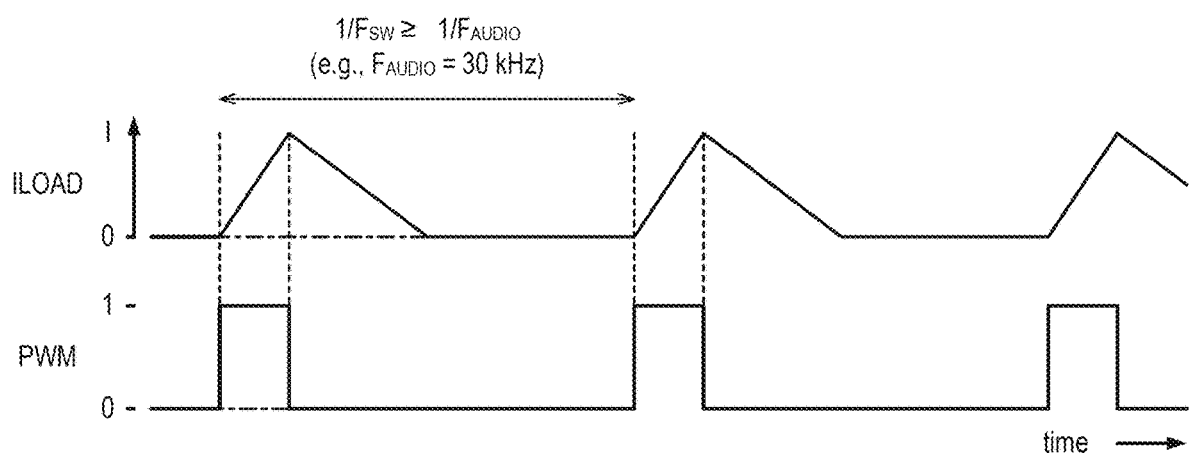
Fig. 7B
| Switching frequency $F_{SW}$ | ABS |
|---|---|
| $> F_{AUDIO}$ | 0 |
| $\leq F_{AUDIO}$ | 1 |
Fig. 7C Very light load current arrangement

| Comparative example | | | | |
|---|---|---|---|---|
| ILOAD | Undershoot (mV) | | | |
| | Buck | Buck/ Boost | Extreme Boost | Boost |
| Very light | 36.9 | 30.8 | 36.8 | 32.8 |
| | 52.6 | 45.5 | 51.6 | 74.1 |
| | 76.3 | 68.7 | 75.4 | 69.5 |
| | 94.7 | 87.1 | 99.8 | 88.6 |
| | 107.4 | 103.2 | 125.3 | 105.9 |
| Very high | 14.8 | 13.9 | 11.1 | 6.1 |
| | 23.3 | 0 | 39.3 | 17.4 |
| | 19.4 | 16.6 | 99.3 | 5.0 |

Fig. 17A

| Deferred DAC | | | | |
|---|---|---|---|---|
| ILOAD | Undershoot (mV) | | | |
| | Buck | Buck/ Boost | Extreme Boost | Boost |
| Very light | 5.0 | 15.1 | 6.7 | 13.8 |
| | 6.2 | 7.1 | 2.7 | 6.9 |
| | 3.3 | 2.6 | 5.3 | 3.9 |
| | 2.8 | 3.6 | 3.4 | 2.4 |
| | 2.9 | 1.3 | 0.1 | 12.7 |
| Very high | 2.2 | 0.6 | 0.3 | 0.2 |
| | 1.5 | 0 | 4.8 | 7.5 |
| | 1.4 | 3.3 | 6.7 | 1.1 |

Fig. 17B

DEVICE AND METHOD FOR CONTROLLING OUTPUT VOLTAGE OF A DIGITAL-TO-ANALOG CONVERTER

CROSS-REFERENCE TO RELATED PATENT APPLICATIONS

This application claims priority to U.S. Provisional Patent Application Ser. No. 62/928,677, entitled "Reduction of Undershoot During Output Voltage Ramp-Down of Power Converter Regulator" filed Oct. 31, 2019, the contents of such application being hereby incorporated by reference in its entirety and for all purposes as if completely and fully set forth herein.

TECHNICAL FIELD

The present implementations relate generally to voltage regulators, and more particularly to controlling output voltage of a digital-to-analog converter.

BACKGROUND

Switching regulators can be used to convert one DC voltage to another DC voltage. For example, a buck converter can be used to step-down a voltage, a boost converter can be used to step-up a voltage, and a buck-boost can be used for stepping-down or stepping-up a voltage. A switching regulator typically employs pulse-width modulation (PWM) to control switches in a power stage to vary current flowing through an inductor. The duty cycle of a PWM signal is controlled based on the inductor current and varying the duty cycle is used to adjust the output voltage. The output DC voltage of the switching regulator is set using a target voltage. The target voltage can be fixed or can be controllably adjusted using a digital-to-analog converter (DAC).

SUMMARY

According to a first aspect of the present invention there is provided a device or DAC control logic for controlling a DAC for supplying a target voltage VTARGET to a switching converter. The device or DAC logic comprises control logic which is configured, in response to DAC ramp-down, to decrement DAC input code supplied to the DAC in a series of steps. The device or DAC logic is configured, for at least some of the steps during ramp down, to wait until at least one switching cycle has occurred in the switching converter before decrementing the DAC input code from a current value to a new value. This can help to reduce undershoot of the output voltage of the DAC.

The device or DAC logic may further comprise a ramp-down detector configured to identify DAC ramp-down by determining whether a new DAC input code is less than a current DAC input code.

The device or DAC logic may further comprise a calculator configured to calculate a difference $\Delta$ between a new DAC input code and a current DAC input code. The difference $\Delta$ is a current cycle counter indicating the remaining number of switching cycles before the target voltage VTARGET is reached.

The control logic may be configured to determine a condition including whether the difference $\Delta$ is less than or equal to a predetermined value N, and, upon a positive determination, to wait until the at least one switching cycle has occurred before decrementing the DAC input code, and, upon a negative determination, to decrement the DAC input code from the current value to the new value whether or not the at least one switching cycle has occurred.

The predetermined value N represents the number of switching cycles before the target voltage VTARGET is reached during which decreasing the DAC input code should wait before the switching cycle(s) has (have) occurred. The predetermined value N may be selected from the range between 5 and 30 or between 10 and 20. The predetermined value N may be between 0 and $0.2\Delta$ (i.e., up to 20% of the difference $\Delta$) or may be between 0 and $0.1\Delta$ (i.e., up to 10% of the difference $\Delta$). The predetermined value N may be determined based on an expected value of $\Delta$ which in term may be determined based on the number of DAC levels. Decrementing the decrementing the DAC input code may occur in response to a DAC clock edge, e.g., a rising DAC clock rate.

The condition may further include whether the switching regulator is applying audio band suppression which suppresses switching below a given frequency. Audio band suppression may be achieved by introducing additional switching cycles so as to maintain a minimum switching frequency. The control logic may be configured, upon the positive determination, decreasing a DAC clock rate.

According to a second aspect of the present invention there is provided DAC logic comprising the device or DAC control logic of the first aspect. The DAC logic may further comprise a DAC clock generator for generating a DAC update clock signal. The DAC logic may further comprise a first data latch for receiving and storing a new DAC input code. The DAC logic may further comprise a second data latch for receiving and storing a current DAC input code for providing to the DAC.

The DAC logic may further comprise registers, for example, to store the predetermined value N. The predetermined value N may be programmable, e.g., by an external processor-based controller.

The DAC logic may further comprise logic for Boolean combining signals from the switching converter. The DAC may be an n-bit DAC, where $5 \leq n \leq 16$, for example $8 \leq n \leq 12$. For example, the DAC may be a 10-bit DAC.

According to a third aspect of the present invention there is provided a system, comprising a DAC and DAC logic including the device or DAC control logic of the first aspect, the DAC logic arranged to supply the DAC input code to the DAC. The DAC logic may also provide a DAC update clock signal.

According to a fourth aspect of the present invention there is provided a monolithic integrated circuit, comprising the system of the third aspect. Thus, the monolithic integrated circuit may be a DAC IC. The monolithic integrated circuit may comprise more than one DAC and each DAC may have respective DAC control logic.

The monolithic integrated circuit may comprise a switching converter and the DAC may be configured to provide a target voltage to the switching converter. Thus, the monolithic integrated circuit may be a switching converter IC. The switching converter IC may include a power stage (e.g., comprising two or more power transistors for switching current through an energy storage element such as an inductor coil.)

The switching converter may be a hysteretic switching converter, for example, employing a synthetic current ramp. The switching converter may be a current-mode switching converter. The switching converter may be a voltage-mode switching converter. The switching converter may be a non-isolated switching converter. The switching converter may include an inductor coil as an energy-storing element. The switching converter may be a Buck converter, a Boost converter, a Buck-Boost or inverting converter.

According to a fifth aspect of the present invention there is provided a method of controlling a DAC which supplies a target voltage VTARGET to a switching regulator. The method comprises, in response to DAC ramp-down, decrementing DAC input code supplied to the DAC in a series of steps. For at least some of the steps (e.g. for all of the steps or for only the last N steps, where N is a positive non-zero integer), decrementing the DAC input code comprises waiting until at least one switching cycle has occurred in the switching converter before decrementing the DAC input code from a current value to a new value.

The method may further comprise identifying DAC ramp-down by determining whether a new DAC input code is less than a current DAC input code.

The method may further comprise calculating a difference $\Delta$ between a new DAC input code and a current DAC input code. The difference $\Delta$ is a current cycle counter indicating the remaining number of switching cycles before the target voltage VTARGET is reached.

The method may further comprise determining a condition including whether the difference $\Delta$ is less than or equal to a predetermined value N and, upon a positive determination, waiting until the at least one switching cycle has occurred before decrementing the DAC input code, or, upon a negative determination, decrementing the DAC input code from the current value to the new value whether or not the at least one switching cycle has occurred. The predetermined value N represents the number of switching cycles before the target voltage VTARGET is reached during which decreasing the DAC input code should wait before the switching cycle has occurred.

The predetermined value N may be selected from the range between 5 and 30 or between 10 and 20. The range depends on the switching converter (e.g., control loop bandwidth and number of bits in the DAC).

Decrementing the DAC input code may occur in response to a DAC clock edge, e.g., a rising DAC clock rate.

The condition may further include whether the switching regulator is applying audio band suppression which suppresses switching below a given frequency.

The method may further comprise upon the positive determination, decreasing a DAC clock rate.

The given number is preferably selected from the range between 5 and 30 and, more preferably selected from the range between 10 and 20.

According to a sixth aspect of the present invention is provided a computer program comprising instructions for performing the method of the fifth aspect.

According to a seventh aspect of the present invention is provided a computer program product comprising a computer readable medium (which may be non-transitory) storing the computer program.

According to an sixth eighth aspect of the present invention there is provided an electronic system comprising a power source, the device, the switching regulator, the monolithic integrated circuit of a previous aspect and a load. The electronic system may be a portable (e.g., hand-held or lap-top) electronic device, such as a mobile phone, tablet computing device or laptop computer and the load may be electronic circuitry within the portable electronic device. The electronic system may be a lighting system and the load may be lighting element(s), such as LED(s). The electronic system may be an automotive system and the load may be, for example, an electronic control unit. The power source may be a battery.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 7A is a timing chart showing variation of inductor current and PWM with time under a low load condition and illustrating switching frequency;

FIG. 7B is a timing chart showing variation of inductor current and PWM with time under a low load condition such that the switching frequency is at the threshold for audio band suppression;

FIG. 7C is table illustrating relationship between a signal ABS switching frequency;

FIGS. 17A and 17B are tables of simulated undershoot voltage as a function of current load for Buck, Boost, extreme Boost and Buck-Boost converters for a DAC shown in FIG. 1 and for a DAC shown in FIG. 4, respectively;

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Figure 1:
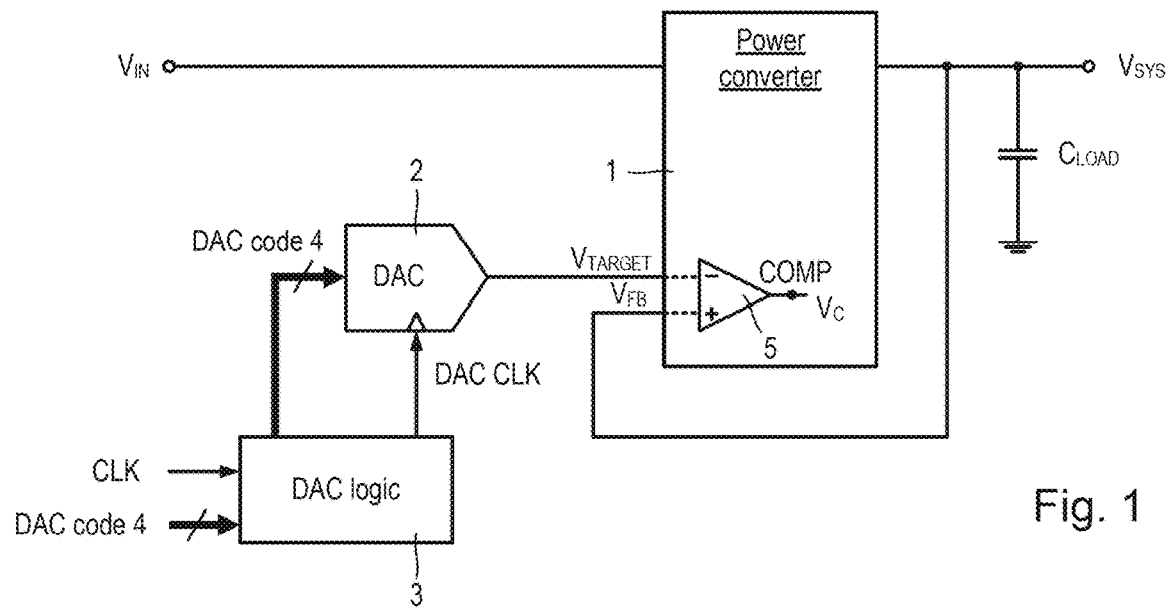
FIG. 1 is a schematic block diagram of a power converter and a DAC providing a target voltage to the power converter.

DAC and DAC control logic. Referring to FIG. 1, a power converter 1 (or "DC-to-DC converter" or "switching regulator"), a digital-to-analog converter (DAC) 2 and DAC control logic 3 are shown. The power converter 1 can take the form of a Buck converter, a Boost converter, Buck-Boost converter or other similar type of converter.

The DAC 2 includes an input for receiving a n-bit DAC code 4, for example an 8-bit DAC, and an output for providing a corresponding analog output voltage which serves as a target voltage $V_{TARGET}$ for the power converter 1.

The DAC 2 is controlled by DAC control logic 3 in an arrangement which is herein referred to as a "simple DAC arrangement" or "simple DAC". As will be explained in more detail hereinafter, the simple DAC arrangement is useful for understanding the invention.

The DAC control logic 3 receives the n-bit digital code and a clock signal CLK and supplies the n-bit digital code and a DAC clock signal DAC CLK which is based on the clock signal CLK to the DAC 2. If the clock rate of the clock signal CLK is too high, the DAC control logic 3 can divide down the clock signal CLK to a suitable rate for the DAC 2.

The power converter 1 converts the voltage signal VIN into an output voltage $V_{SYS}$ according to the target voltage $V_{TARGET}$. The power converter 1 includes an error amplifier 5 which receives directly or indirectly, as first and second inputs, the target voltage $V_{TARGET}$ and the converter output voltage $V_{SYS}$ which is sensed and fed back to the power converter 1 as feedback voltage $V_{FB}$. The error amplifier 5 has an output which outputs an error signal $V_C$ (or "control signal") via a stability compensation node (or "control node") COMP, which is a measure of error between $V_{TARGET}$ and $V_{SYS}$.

The power converter 1 is arranged to reduce the magnitude of the control signal $V_C$ and, in doing so, cause the output voltage $V_{SYS}$ to converge on and track the target voltage $V_{TARGET}$.

Figure 2:
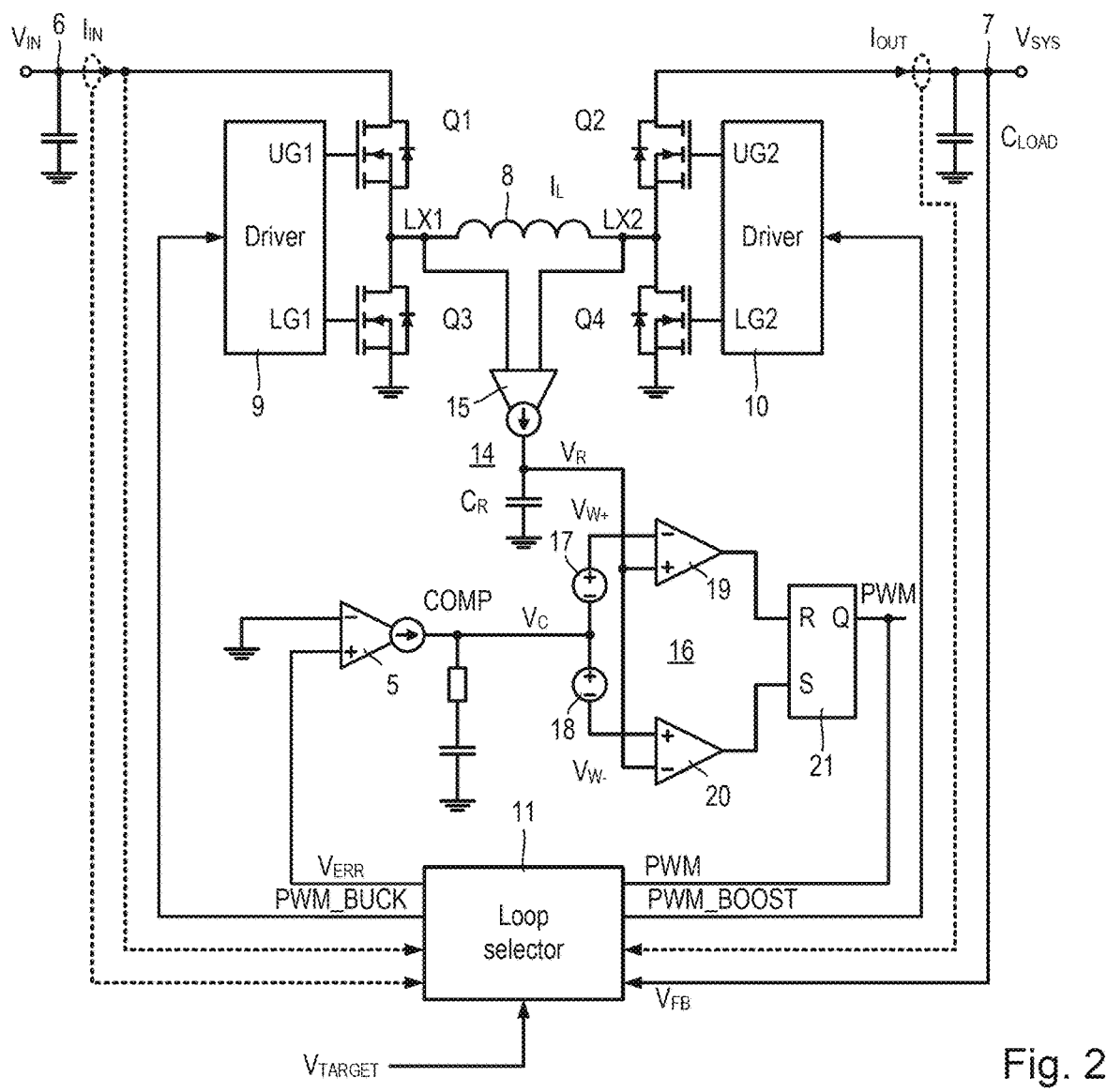
FIG. 2 is a schematic block diagram of a power converter in the form of a Buck-Boost regulator.

Referring to FIG. 2, an example of a power converter 1 in the form of Buck-Boost converter is shown.

The power converter 1 has a voltage input node 6 and a voltage output node 7, and employs an energy-storage element in the form of an inductor 8 having first and second nodes (or "phase nodes") LX1, LX2. First and second pairs of switches Q1, Q3, Q2, Q4, driven by first and second drivers 9, 10, respectively, are used to control the voltage across the inductor 8.

In the first pair of switches, first and third switches Q1, Q3 are arranged in a totem pole configuration between the voltage input node 6 and ground GND. In the second pair of switches, second and fourth switches Q2, Q4 are arranged in a totem pole configuration between the voltage output node 7 and ground GND. The switches Q1, Q2, Q3, Q4 take the form of suitable power transistors, such as power MOSFETs.

The first gate driver 9 supplies upper and lower gate drive signals UG1, LG1 to the first (high-side) and third (low-side) switches Q1, Q3, respectively. The second gate driver 10 supplies upper and lower gate drive signals UG2, LG2 to the second (high-side) and fourth (low-side) switches Q2, Q4, respectively. The gate drivers 9, 10 are controlled by a loop selector 11 which is controlled by a pulse-width modulation (PWM) signal PWM and which output first and second PWM signals PWM_BUCK, PWM_BOOST to the first and second gate drivers 9, 10 respectively.

Output current $i_{OUT}$ and, optionally, input current $i_{IN}$ is (are) sensed and the sensed current(s) is (are) fed into the loop selector 11. The loop selector 11 includes a zero-crossing detector (not shown) which generates a zero-crossing detector signal ZCD (not shown) which can be used to control the gate drivers 9, 10. The output voltage $V_{SYS}$ and optionally the input voltage $V_{IN}$ is (are) sensed and fed back to the loop selector 11.

The power converter 1 includes a synthetic ramp generator circuit 14 which includes a transconductance (or "$g_m$") amplifier 15 and a modulator capacitor $C_R$. Inductor current information is synthesized by sensing the voltage across the inductor using the transconductance amplifier 15 and generating a saw-tooth voltage ramp $V_R$ that is proportional to inductor current $I_L$.

A hysteretic control section circuit 16 includes the error amplifier 5 which receives an error voltage $V_{ERR}$, where $V_{ERR}=V_{TARGET}-V_{FB}$, from the loop selector 11. The error amplifier 5 outputs the error signal $V_C$ via the stability compensation node COMP which is supplied to first and second voltage level generators 17, 18 for generating upper and lower window levels $V_{W+}, V_{W-}$ which are supplied to an inverting input of a first comparator 19 and to a non-inverting input of a second comparator 20, respectively. The voltage ramp $V_R$ is supplied to both the non-inverting input of the first comparator 18 and the inverting input of a second comparator 19.

Outputs of the first and second comparators 19, 20 are provided to reset R and set S inputs, respectively of an SR latch 21. The Q output of the latch 21 is supplied as a PWM signal ("PWM") to the loop selector 11.

Regulator undershoot during ramp down. Dynamically changing the target output voltage $V_{TARGET}$ can present significant challenges, especially during ramp down, when trying to achieve minimal undershoot of the output voltage $V_{SYS}$ over a full range of operating conditions and modes.

The regulator 1 attempts to control the output voltage $V_{SYS}$ within a specified tolerance range relative to a target voltage $V_{TARGET}$. As explained earlier, the power switches Q1, Q2, Q3, Q4 are driven by PWM signals PWM_BUCK, PWM_BOOST, and the regulator 1 adjusts the PWM duty-cycle and frequency to regulate the output. The stability compensation node COMP is the main loop stability compensation node.

Figure 3:
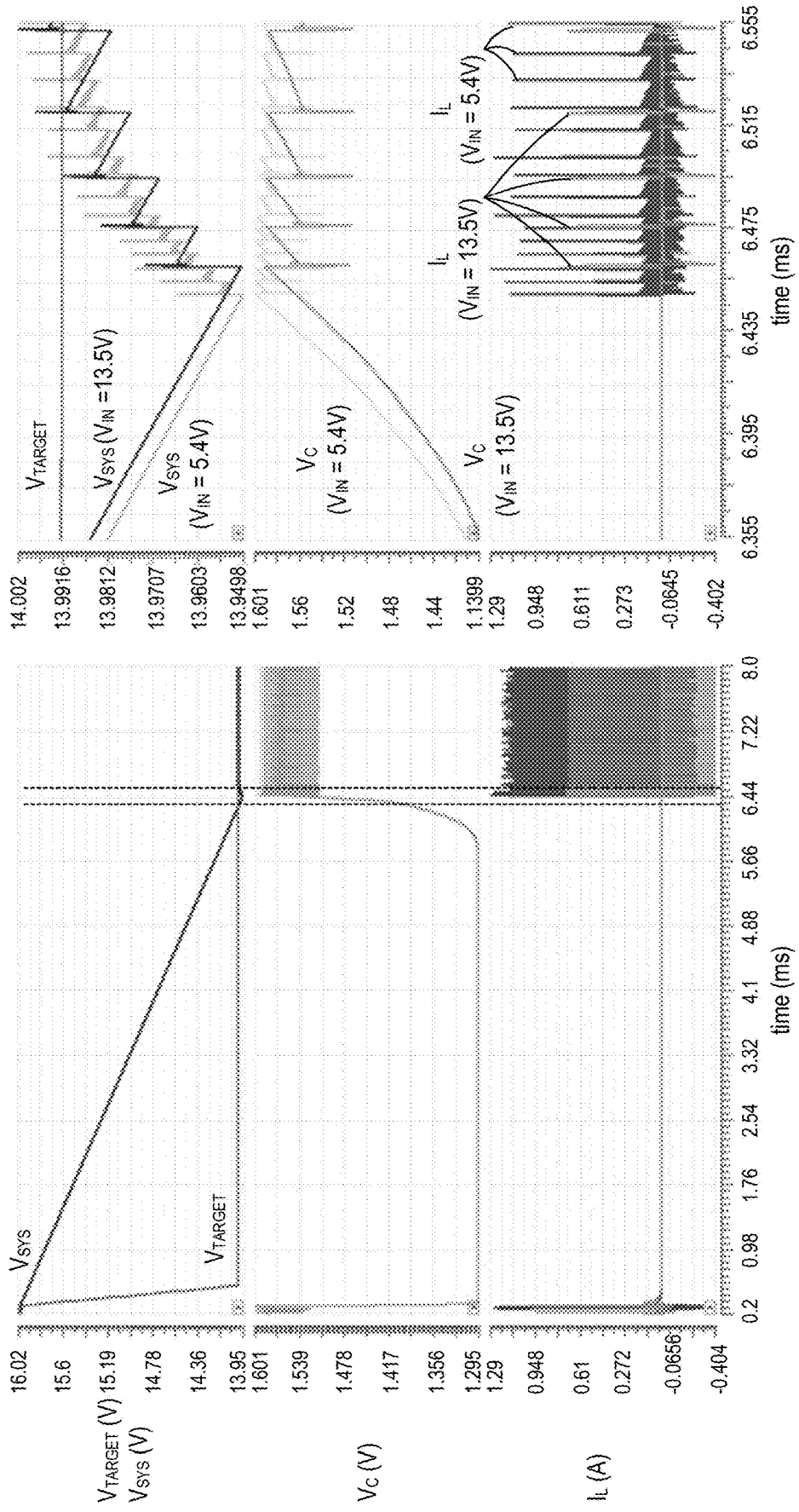
FIG. 3 illustrates simulated DAC output voltage and target voltage, together with compensation output voltage and inductor current, for the power converter and DAC shown in FIG. 1.

FIG. 3 illustrates the problem of undershoot during ramp down of the target voltage $V_{TARGET}$ in the simple DAC arrangement shown in FIG. 1 for $V_{IN}$=5.4 V and $V_{IN}$=13.5 V.

Referring to FIGS. 1 and 3, the DAC control logic 3 causes the target voltage $V_{TARGET}$ to be decremented continuously to a final level at a specified ramp-down rate. Undershoot can significantly exceed specification, particularly under light-load conditions. Herein, a light load is defined as being about 10 mA. However, the definition of light and heavy loads depends on the application. For light loads, $V_{TARGET}$ falls faster than the converter output voltage $V_{SYS}$ and so the control voltage $V_C$ at the stability compensation node COMP is clamped at its minimum level, while the converter output voltage $V_{SYS}$ approaches $V_{TARGET}$. It takes time for the control voltage $V_C$ to return to its operating range. During this period, the converter output voltage $V_{SYS}$ undershoots. In the case shown in FIG. 3, the undershoot is 43 mV.

Undershoot can have a deleterious effect in many cases, such as when the load is a digital system (such as an IC) having HIGH and LOW binary states, an electronic component (such as an LED) having an a ON threshold voltage, or other voltage-level dependent system in which there is minimum critical voltage for reliable operation.

One way to reduce power consumption is to reduce supply voltage. This reduces voltage headroom between the minimum critical voltage (e.g., the voltage level at which there is a change in state) and the signal voltage (which depends on the supply voltage). If power is reduced to level that signal voltage to lie just above the minimum critical voltage, then any undershoot might cause the signal voltage to dip below the minimum critical voltage and so generate, in the case of a digital system, errors and, in the case of an electronic component, noise (such as, LED flicker).

Figure 4:
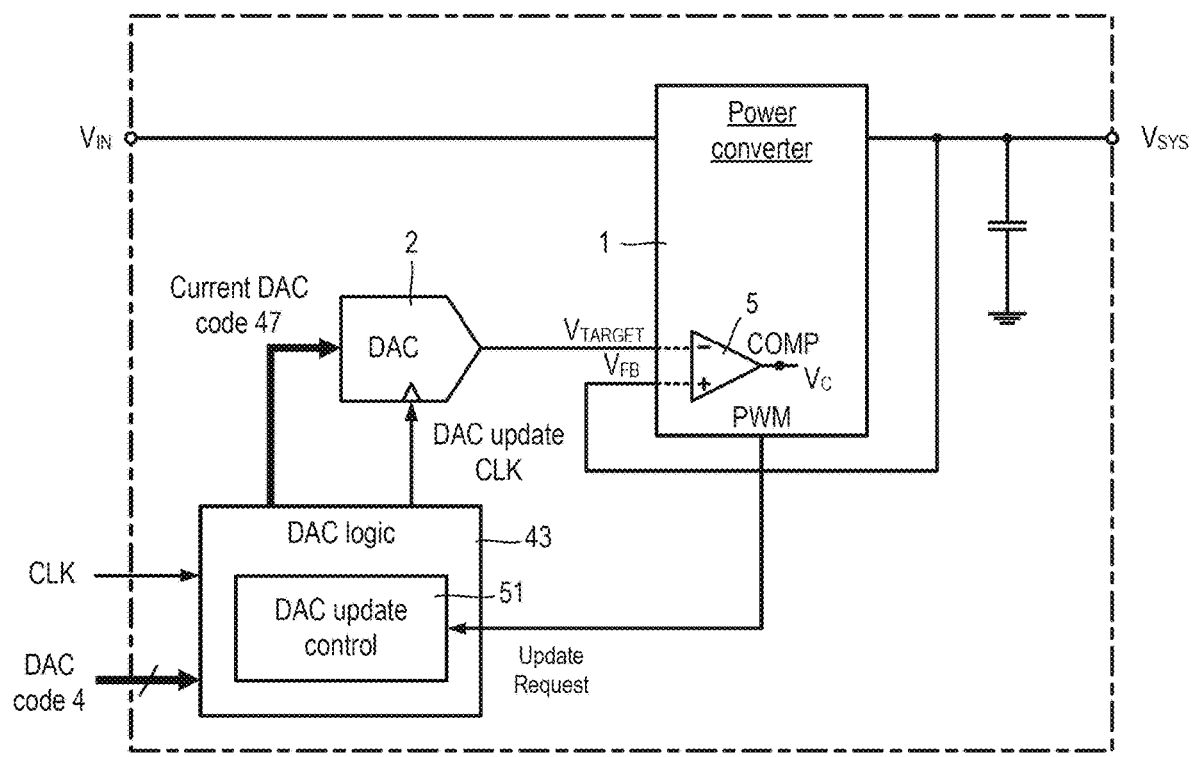
FIG. 4 is a schematic block diagram of a power converter and a DAC providing a target voltage to the power converter, and DAC logic including DAC update control logic for controlling the output voltage of the DAC.

Controlling converter output voltage $V_{SYS}$ during ramp-down. Referring to FIG. 4, the power converter 1 and DAC 2 are shown, together with DAC logic 43 (herein referred to as a "deferred DAC arrangement" or "deferred DAC") which regulates or controls the decrease in target voltage $V_{TARGET}$ so as to reduce undershoot in the output voltage $V_{SYS}$.

The DAC logic 43 is similar to the DAC logic 3 shown in FIG. 1, except that includes a DAC update control block 51 which controls reduction of the DAC code based on an Update Request signal. In some examples, the PWM signal may be used as the Update Request signal. In other examples, the Update Request signal may be generated using two or signals, such as the PWM signal and, where audio band suppression (ABS) is used, an ABS signal which signals that the power converter 1 is in an ABS state.

During ramp down, the DAC update control 51 causes a step down in DAC code to be deferred (or "to wait") until a PWM switching cycle has occurred, if one has not already occurred since the last step down. This can help ensure that the DAC 2 is not updated until the converter output voltage $V_{SYS}$ has reached the target voltage $V_{TARGET}$ corresponding to previous DAC code. Thus, the control $V_C$ is kept within the correct operating range and so there is no settling time as DAC reaches its final target.

Figure 5:
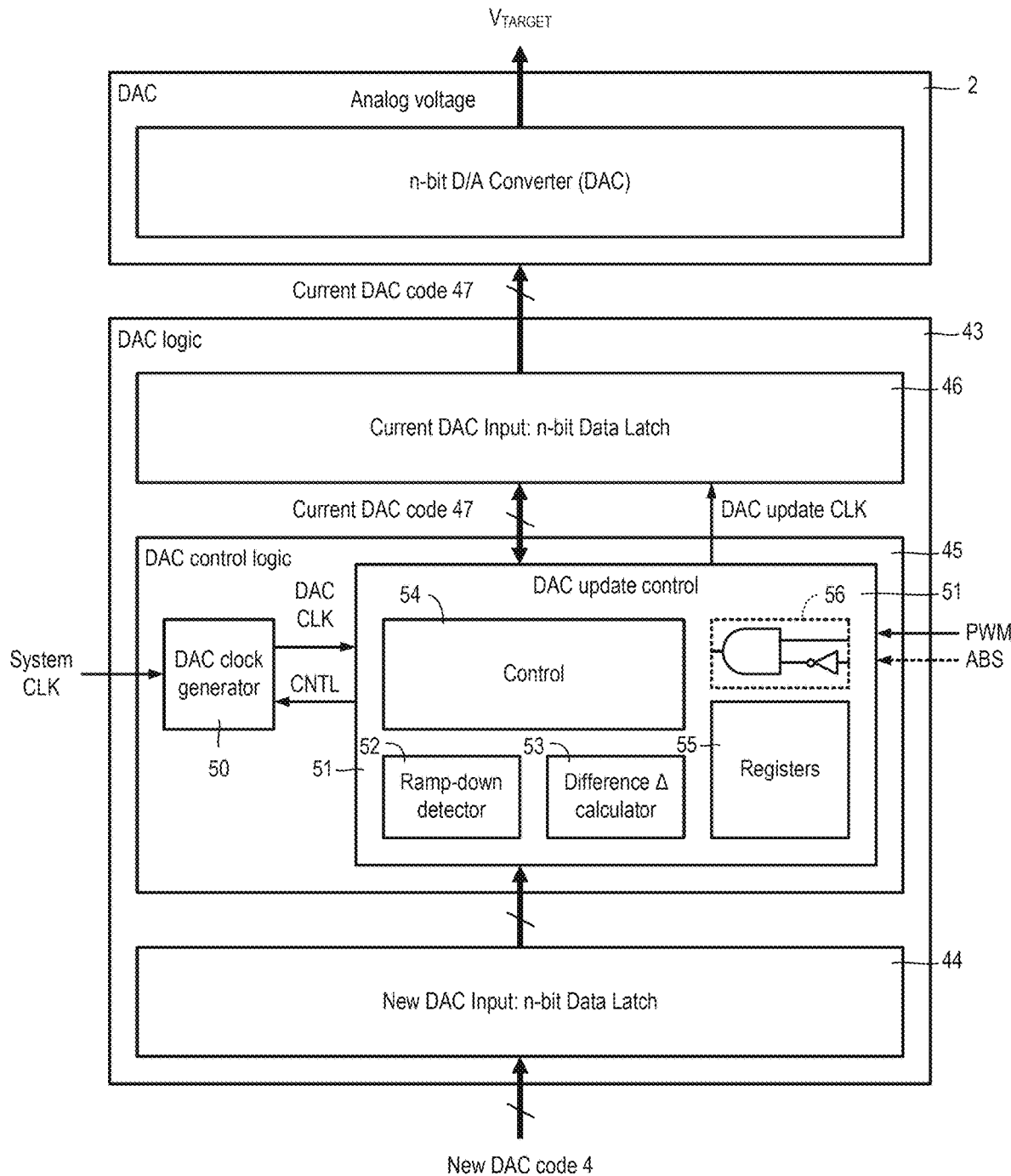
FIG. 5 is a schematic block diagram of a DAC logic including DAC update control logic.

DAC 2 and DAC control logic 45. Referring to FIG. 5, the DAC 2 and DAC logic 43 are shown in more detail.

The DAC logic 43 includes a first data latch 44 for receiving and storing a new DAC code (for example, from a microcontroller), DAC control logic 45 and a second data latch 46 for receiving and storing a DAC code 47 ("the current DAC code") before being sent to the DAC 2.

The DAC control logic 45 includes a DAC clock generator 50, which generates the DAC clock signal DAC CLK based on the clock signal CLK, and the DAC update control 51.

The DAC update control 51 includes a ramp-down detector 52, a difference calculator 53, control logic 54, registers 55 and, optionally, Update Request signal generator 56.

The ramp-down detector 52 is arranged to identity the occurrence of ramp down in dependence on the new DAC code and the current DAC. When ramp-down is identified, the DAC update control 51 enters a mode or state in which it controls (or "defers") a step decrease in the DAC code 47.

The difference calculator 53 is arranged, in response to ramp-down being detected, to calculate an initial value of the difference Δ between the new DAC code and the current DAC code 47. As will be explained later, the DAC update control 51 decreases the difference Δ every time the DAC code 47 is decreased. The difference Δ is used to indicate how close the DAC 2 is to supplying the target voltage $V_{TARGET}$ corresponding to the new DAC code. Herein, the point when the target voltage $V_{TARGET}$ corresponding to the new DAC code is referred to "the end of ramp-down").

The registers 52 store, among other things, a cycle number N. The cycle number N is programable or can be hardcoded. The cycle number N is used to define the point (measured in number of cycles from the end of ramp down) at which the DAC control logic 45 starts to control the decrease in target voltage $V_{TARGET}$.

The DAC update control 51 can include an Update Request signal generator 56. The Update Request signal generator 56 includes a NOT gate 57 for inverting ABS so generating ABS bar (or "nABS") and a two-input AND gate which receive PWM and nABS.

Figure 6:
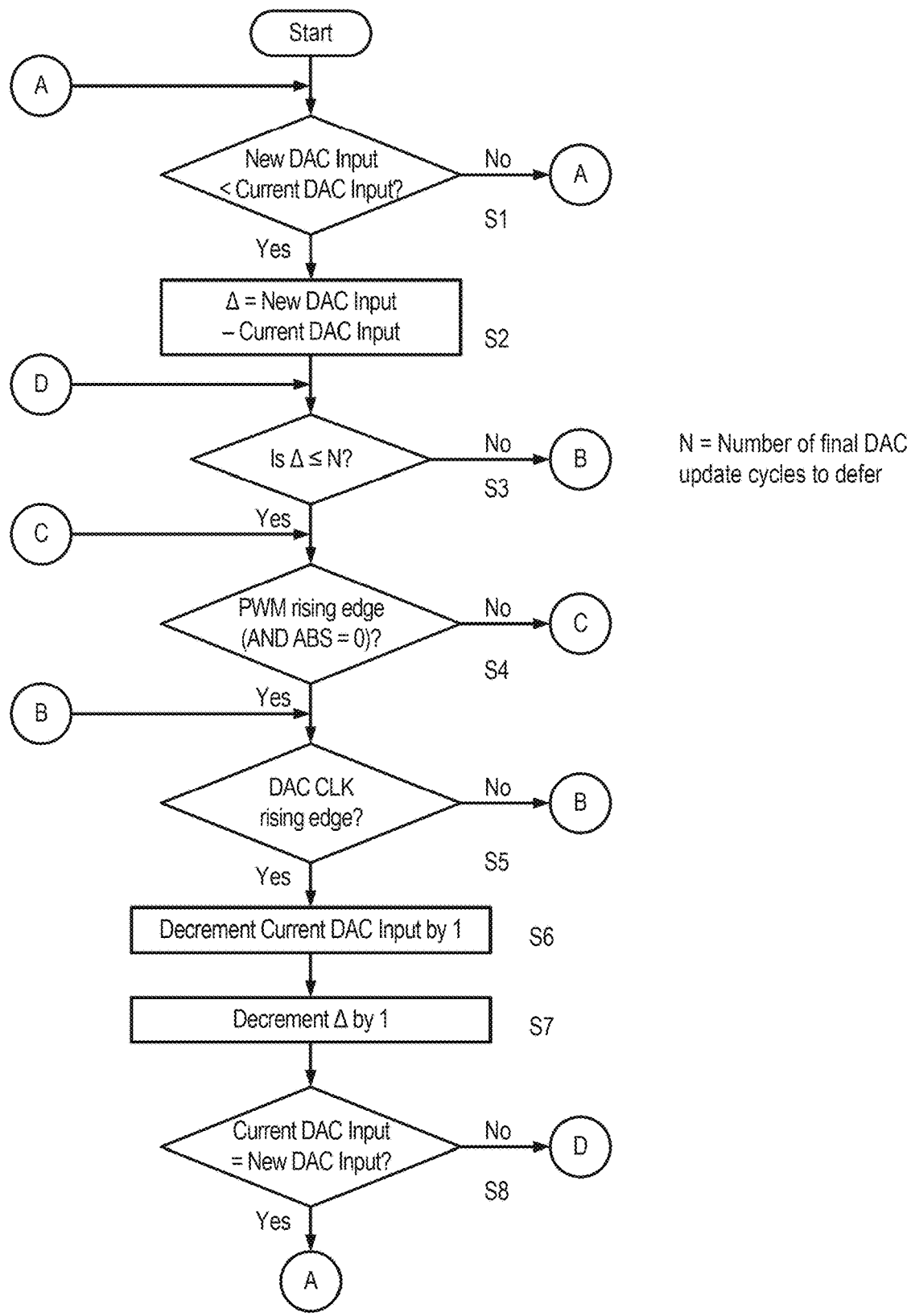
FIG. 6 is process flow diagram of DAC update control.

Referring to FIGS. 5 and 6, operation of the DAC update control block 51 will now be described.

When a new DAC code is received, the DAC update control 51 determines whether the target voltage $V_{TARGET}$ is being ramped-down (step S1). If the new DAC code is the same or higher (more positive) than the current DAC code 47, then it waits for the next new DAC code.

If ramp-down is identified, the DAC update control 51 calculates an initial value of the difference Δ between the new DAC code and the current DAC code 47 (step S2). This value of Δ is stored in the registers 55.

The DAC update control 51 determines whether control the decrease in target voltage $V_{TARGET}$ should start by comparing the current value of Δ with the cycle number N (step S3).

If the target voltage $V_{TARGET}$ is to be controlled, then DAC update control 51 waits for the next PWM cycle to start which is indicated by the rising edge of PWM or the Update Request (step S4). Once the PWM cycle starts, then DAC update control 51 waits for the next DAC clock cycle which is indicated by the rising edge of DAC CLK (step S5).

The DAC update control 51 then decreases the DAC code 47 stored in the latch 46 by a step size, in this case 1, (step S6) and also decreases the value of Δ by the same step size (step S7).

If, at step S3, the DAC update control 51 determines that control of target voltage is not required, then it proceeds to stepping down the DAC code 47 stored in the latch 46 and also decreasing the value of Δ at the next available DAC clock cycle (steps S5, S6 & S7).

The DAC update control 51 continues this process until the DAC output (i.e., the DAC code 47 stored in the latch 46) equals the new DAC code (step S8).

Once the process is finished, the process starts from step S1, with the DAC update control 51 waiting for the next new DAC code.

Reducing ramp down time. Referring still to FIGS. 4, 5 and 6, as explained earlier, one approach to minimising undershoot is always to defer the DAC update to the next PWM switching cycle. For example, this can be achieved by omitting step S3 or setting N to a large number, preferably which exceeds the number of DAC levels, such as, for a 10-bit DAC, 1024. One downside of this approach is that the ramp-down time can increase, particularly in very light $I_{LOAD}$ cases.

An alternative approach is to employ deferment of the DAC update to the next PWM switching cycle, only for the last N-cycles, where N is selected to keep undershoot within specification (i.e., not to exceed a specified value). Thus, this helps to reduce under shoot while also limiting the increase in ramp-down time to a small amount.

This approach allows the output voltage $V_{SYS}$ to ramp down as fast as the load allows, until it reaches the last N cycles. During these final deferred updates, the update clock rate DAC CLK can also be reduced (through control signal CNTL) to its slowest rate to further reduce undershoot.

The combined effect is to allow the control voltage $V_C$ to settle into the correct range before the DAC 2 continues to its final target level, thereby minimizing undershoot, while only slightly increasing settling time (<10%) compared with the simple DAC arrangement, under all load conditions.

Audio band suppression. Referring to FIG. 7A, in a discontinuous conduction mode (DCM), load current $I_{LOAD}$ can be controlled by varying the switching period (1/$F_{SW}$) where FSW is the switching frequency.

Referring to FIG. 7B, as the switching frequency $F_{SW}$ drops, it can begin to approach and even enter into audio band frequency range, generally between 20 and 20,000 Hz, although a 30,000 Hz threshold can be used. This can lead to audio interference.

ABS can be implemented by introduce switching cycles if there are no switching cycles for a period equal to 1/$F_{AUDIO}$. In an ABS switching cycle, there is no net energy delivered to the output. If the DAC 2 is stepped down on an ABS switching cycle, then DAC 2 is updated before the output voltage $V_{SYS}$ has reached the next DAC code.

The problem is that, for light loads when ABS is employed, the $V_{TARGET}$ falls faster than the output voltage $V_{SYS}$ and so the control voltage $V_C$ may be clamped at its minimum level, while output voltage $V_{SYS}$ approaches $V_{TARGET}$. It takes time to get back to operating range and, during this period, the output voltage $V_{SYS}$ undershoots.

Figure 8:
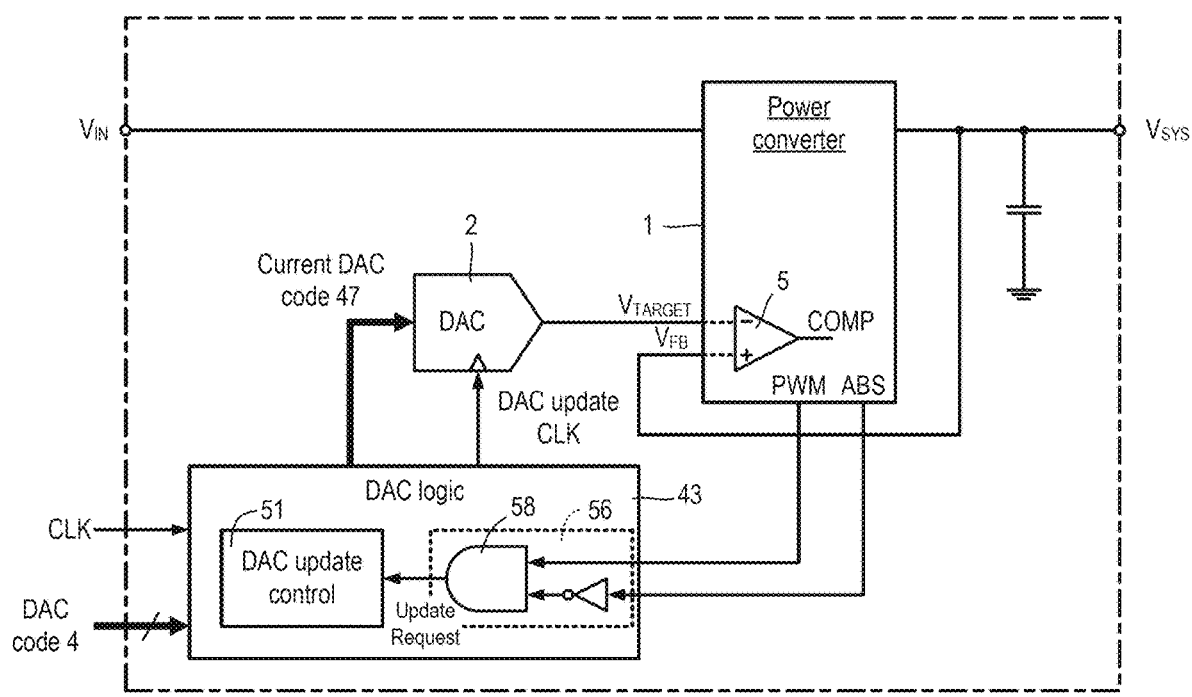
FIG. 8 is a schematic block diagram of a power converter and a DAC providing a target voltage to the power converter, and a DAC control including modified DAC update control for controlling the output voltage of the DAC taking into account audio band suppression.

Referring to FIG. 8, the power converter 1, DAC 2 and DAC logic 43 are shown again. The Update Request is based not only on PWM, but also ABS. Stepping down of the DAC code 47 is inhibited during an ABS cycle, i.e., when ABS is HIGH.

Referring also to FIG. 7C, the power converter 1 can signal when ABS is not being used, (e.g., ABS=0; LOW) and being used (e.g., ABS=1; HIGH)

Simulations. Simulations of output voltage VSYS, the control voltage VC and inductor current IL for a Buck-Boost converter employing the simple DAC and deferred DAC arrangements, under a variety of load conditions, are carried out using Cadence Virtuoso®.

In some cases, the gate voltage Gate Q2 is also simulated, where gate voltage Gate Q2 is an externally available gate drive signal, used to monitor the PWM switching cycle. It is noted, however, that the inductor terminal voltages LX1, LX2 would also give the same information.

The simulation setup is as follows: (1) a Buck-Boost regulator configured for Boost mode operation, (2) DAC ramp-down rate is set to be faster than the load current allows, except for high load currents, and (3) load current=light, medium and high current loads. In this case, a very light load is defined as being around 1 mA, a light load is defined as being around 10 mA, a medium load is defined as being around 200 mA, and a high load is defined as being around as >500 mA. However, these definitions can vary according to application.

The simulations compare the simple DAC arrangement and the deferred DAC arrangement in which only last 10 PWM cycles are deferred (unless otherwise stated). The undershoot region is shown in more detail on the right of each plot.

Simulations are performed for two values of comparator input voltage, namely $V_{IN}$=5.4 V and $V_{IN}$=13.5.

Figure 9:
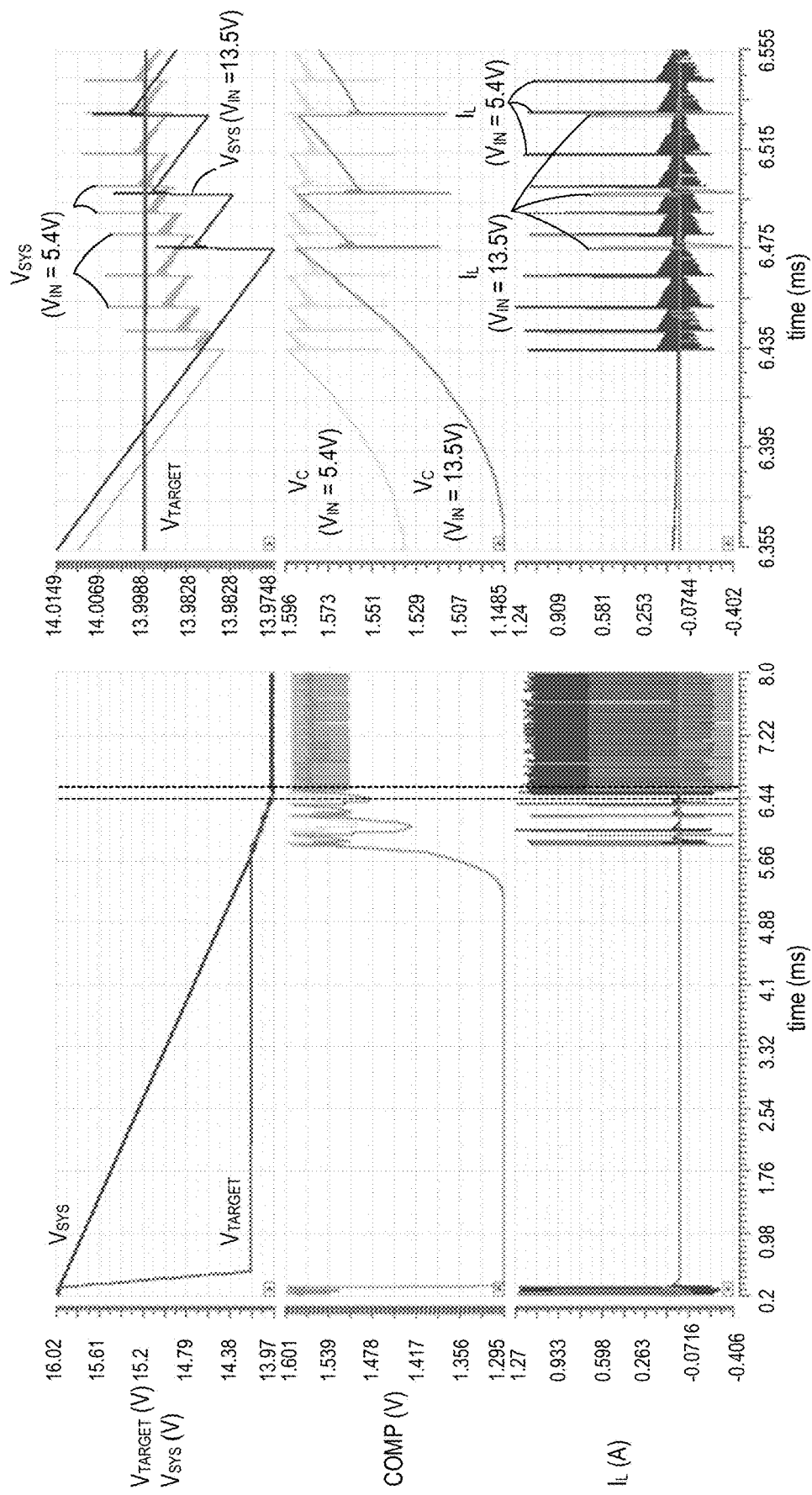
FIG. 9 illustrates simulated DAC output voltage and target voltage, together with compensation output voltage and inductor current, for the power converter and DAC shown in FIG. 4 under a first, light-load condition.

FIG. 9 illustrates simulated DAC output voltage and target voltage, together with compensation output voltage and inductor current, for the power converter and DAC shown in FIG. 4 under a first, light-load condition.

Figure 10:
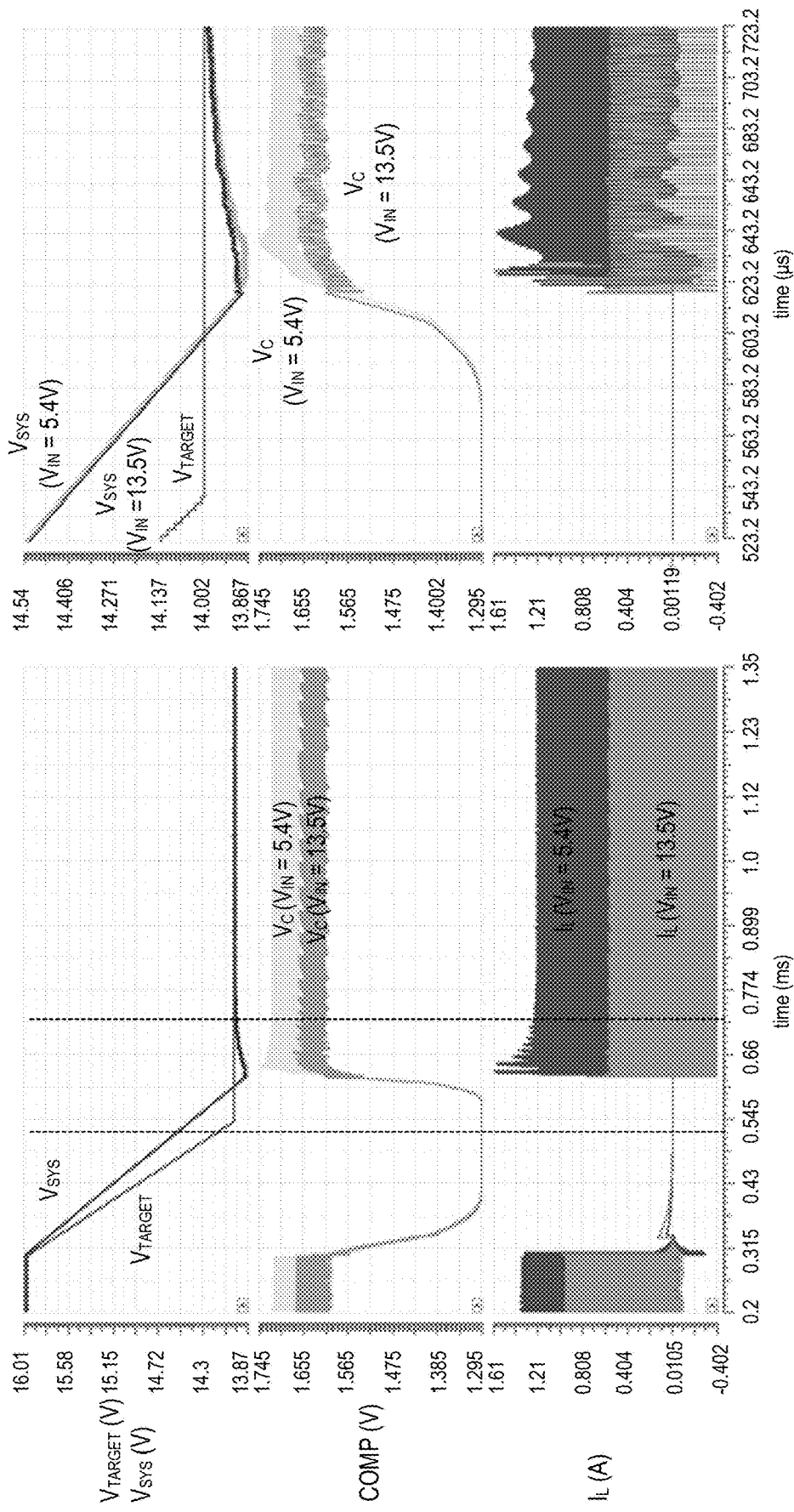
FIG. 10 illustrates simulated DAC output voltage and target voltage, together with compensation output voltage and inductor current, for the power converter and DAC shown in FIG. 1 under a second, medium-load condition.

FIG. 10 illustrates simulated DAC output voltage and target voltage, together with compensation output voltage and inductor current, for the power converter and DAC shown in FIG. 1 under a second, medium-load condition.

Figure 11:
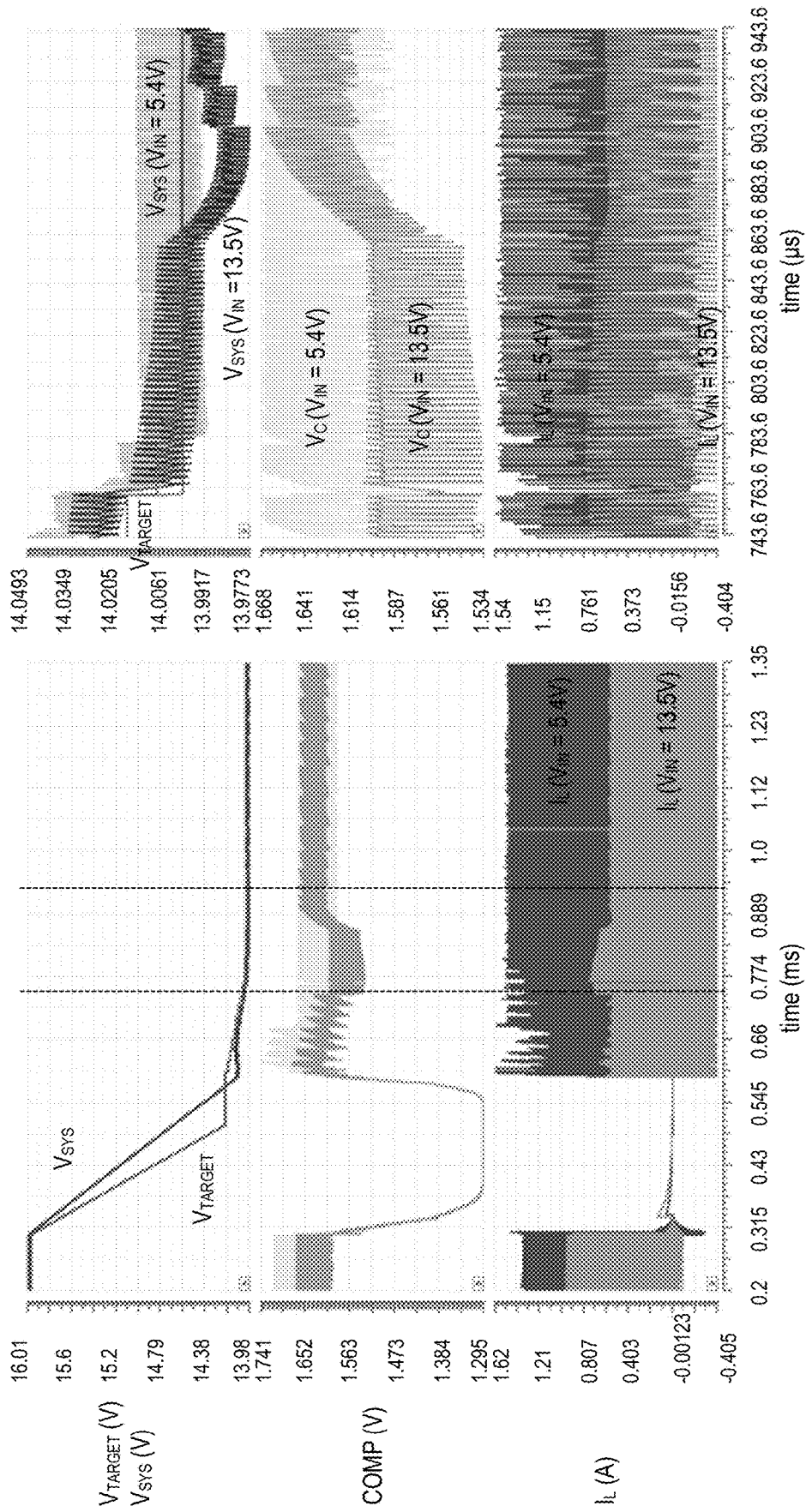
FIG. 11 illustrates simulated DAC output voltage and target voltage, together with compensation output voltage and inductor current, for the power converter and DAC shown in FIG. 4 under a second, medium-load condition.

FIG. 11 illustrates simulated DAC output voltage and target voltage, together with compensation output voltage and inductor current, for the power converter and DAC shown in FIG. 4 under a second, medium-load condition.

Figure 12:
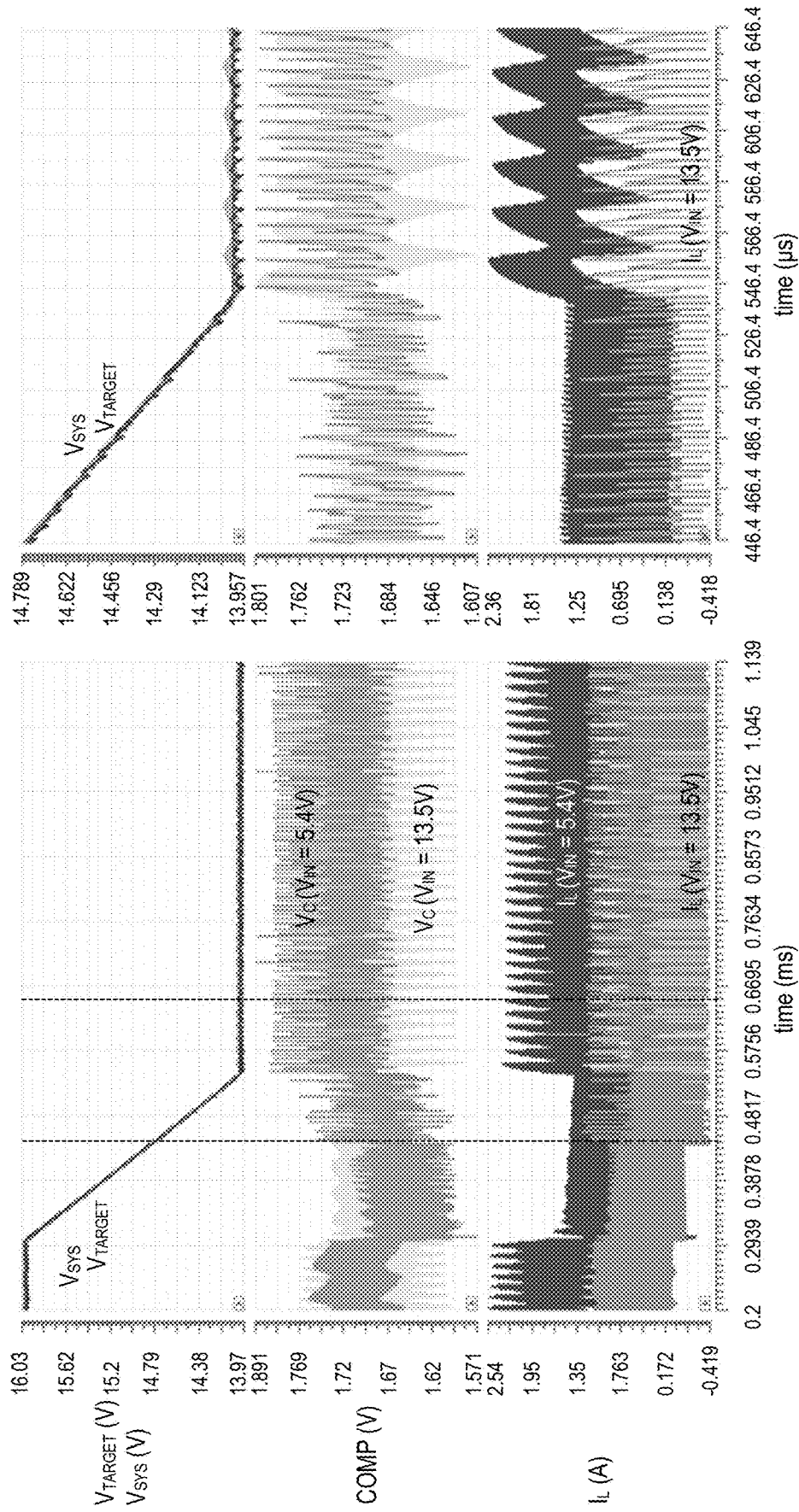
FIG. 12 illustrates simulated DAC output voltage and target voltage, together with compensation output voltage and inductor current, for the power converter and DAC shown in FIG. 1 under a third, high-load condition.

FIG. 12 illustrates simulated DAC output voltage and target voltage, together with compensation output voltage and inductor current, for the power converter and DAC shown in FIG. 1 under a third, high-load condition.

Figure 13:
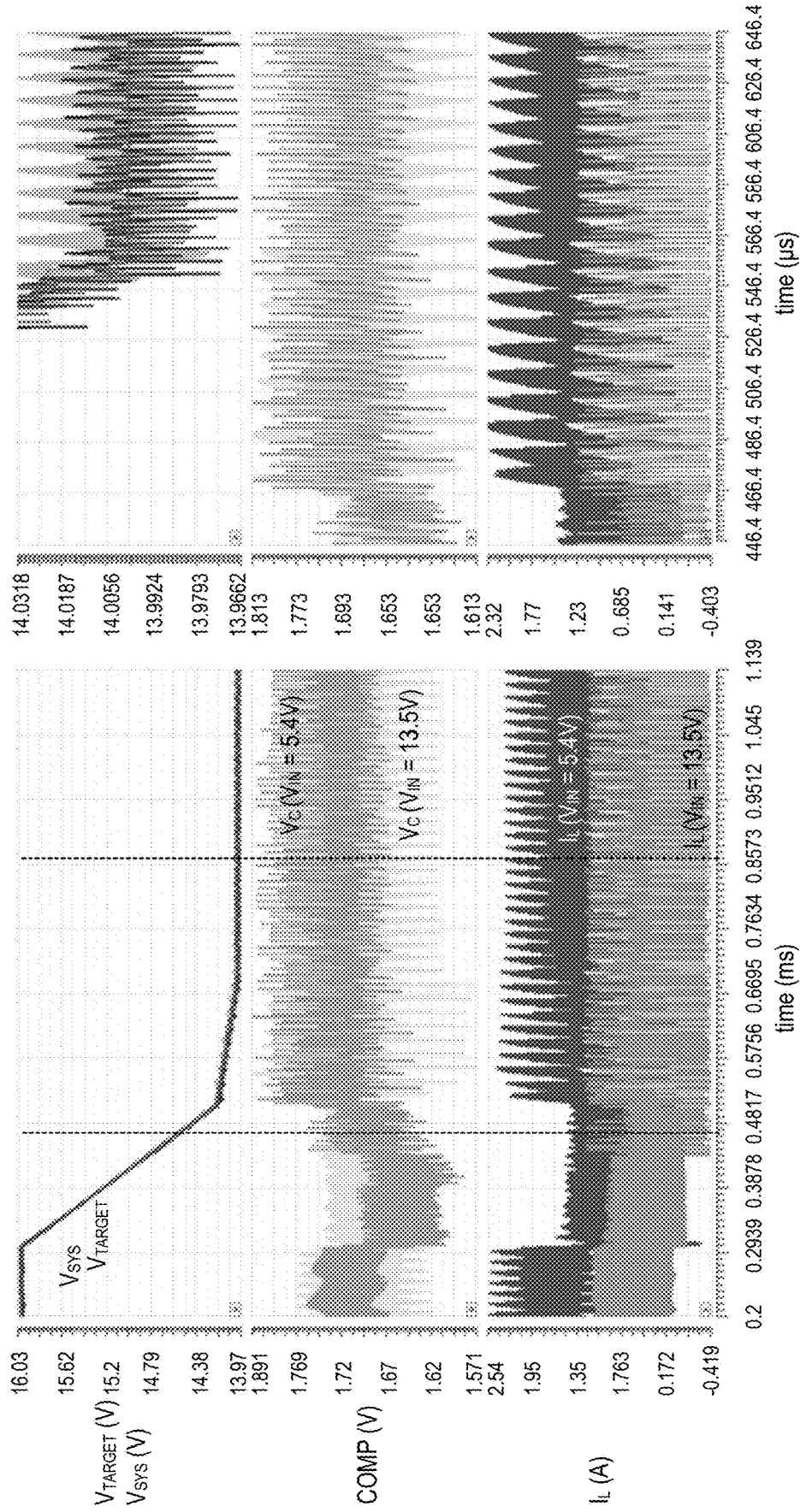
FIG. 13 illustrates simulated DAC output voltage and target voltage, together with compensation output voltage and inductor current, for the power converter and DAC shown in FIG. 4 under a third, high-load condition.

FIG. 13 illustrates simulated DAC output voltage and target voltage, together with compensation output voltage and inductor current, for the power converter and DAC shown in FIG. 4 under a third, high-load condition.

Figure 14A:
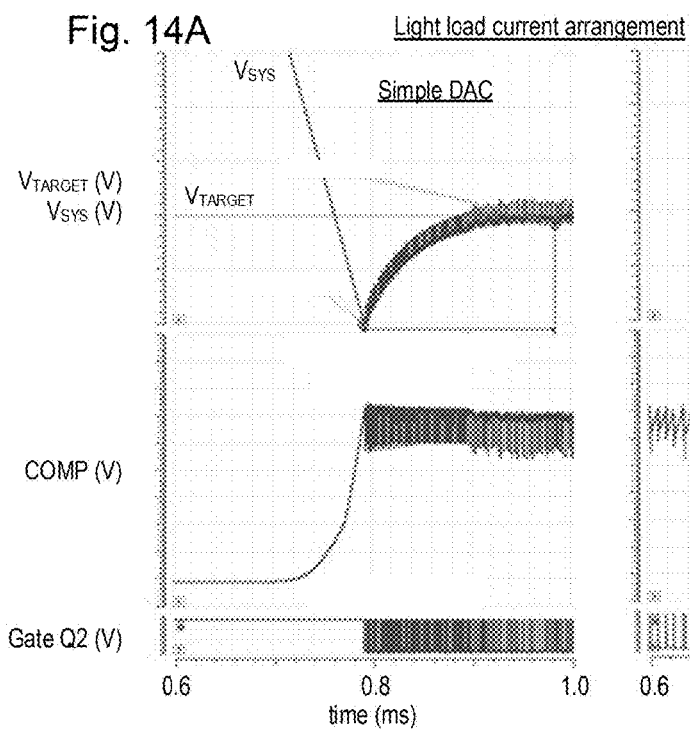
FIG. 14A illustrates simulated DAC output voltage and target voltage, together with compensation output voltage and high-side FET gate voltage, for the power converter and DAC shown in FIG. 1 under a first, light-load condition.

FIG. 14A illustrates simulated DAC output voltage and target voltage, together with compensation output voltage and high-side FET gate voltage, for the power converter and DAC shown in FIG. 1 under a first, light-load condition.

Figure 14B:
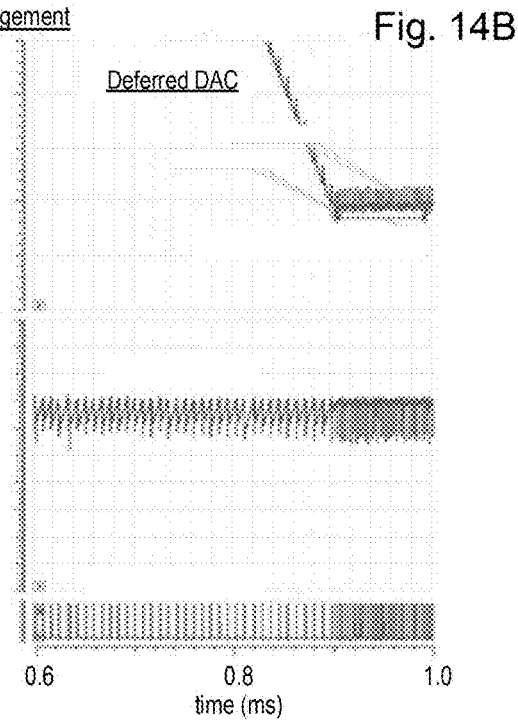
FIGS. 14B to 14D illustrates simulated DAC output voltage and target voltage, together with compensation output voltage and high-side FET gate voltage, for the power converter and DAC shown in FIG. 4, for N exceeds the number of DAC levels, N=10 and N=20 respectively under a first, light-load condition.
Figure 14C:
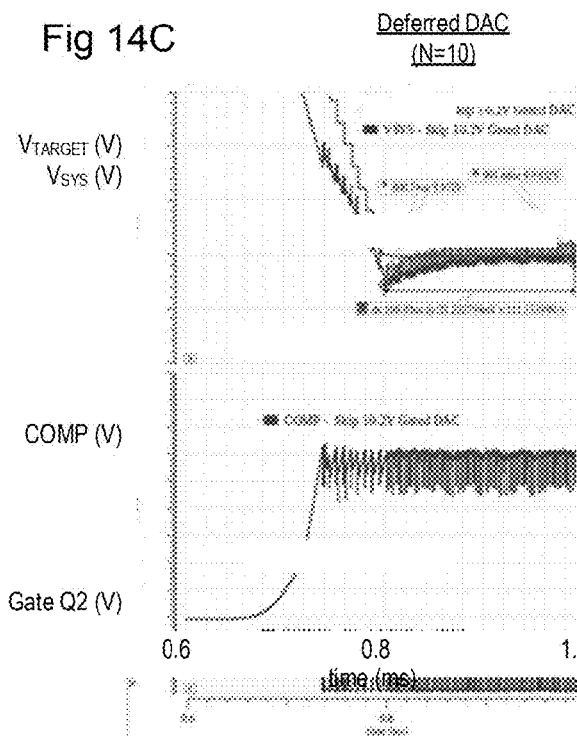
Figure 14D:
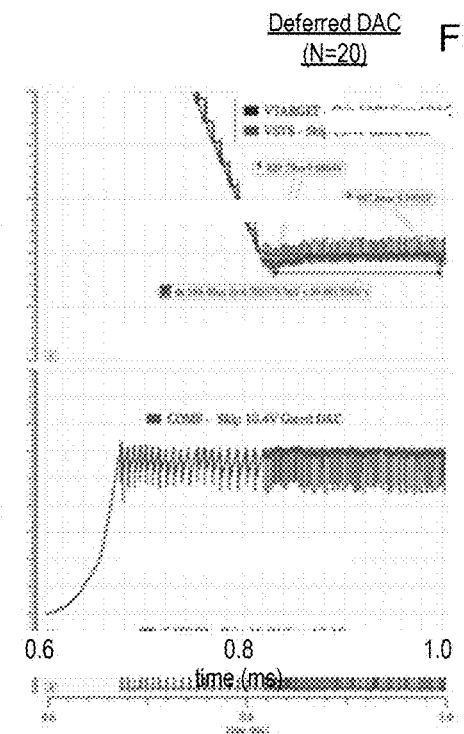

FIGS. 14B to 14D illustrates simulated DAC output voltage and target voltage, together with compensation output voltage and high-side FET gate voltage, for the power converter and DAC shown in FIG. 4, for N exceeds the number of DAC levels, N=10 and N=20 respectively under a first, light-load condition.

Figure 15A:
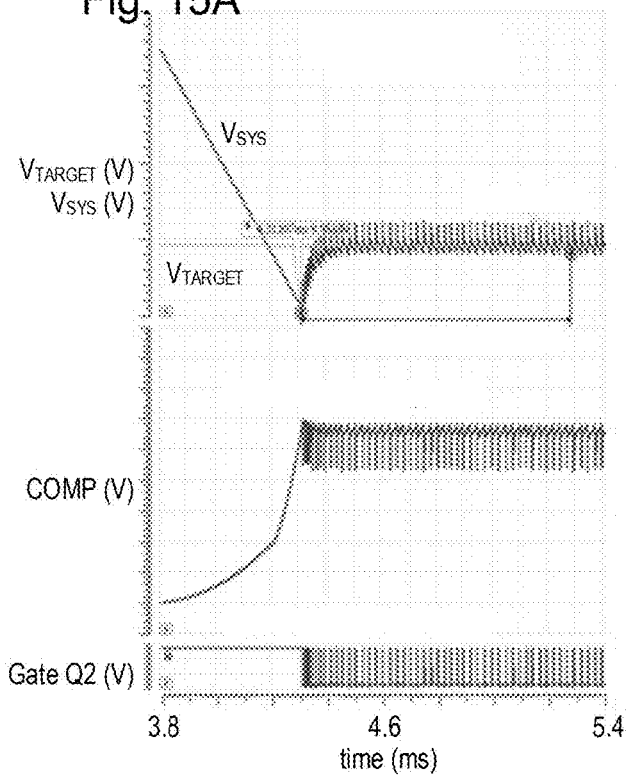
FIG. 15A illustrates simulated DAC output voltage and target voltage, together with compensation output voltage and high-side FET gate voltage, for the power converter and DAC shown in FIG. 1 under a fourth, very light-load condition.

FIG. 15A illustrates simulated DAC output voltage and target voltage, together with compensation output voltage and high-side FET gate voltage, for the power converter and DAC shown in FIG. 1 under a fourth, very light-load condition.

Figure 15B:
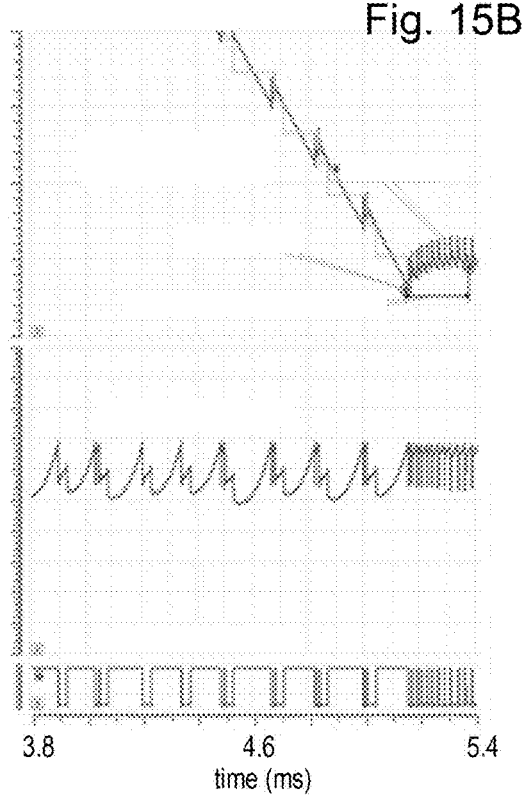
FIGS. 15B to 15D illustrates simulated DAC output voltage and target voltage, together with compensation output voltage and high-side FET gate voltage, for the power converter and DAC shown in FIG. 4, for N exceeds the number of DAC levels, N=10 and N=20 respectively under a fourth, very light-load condition.
Figure 15C:
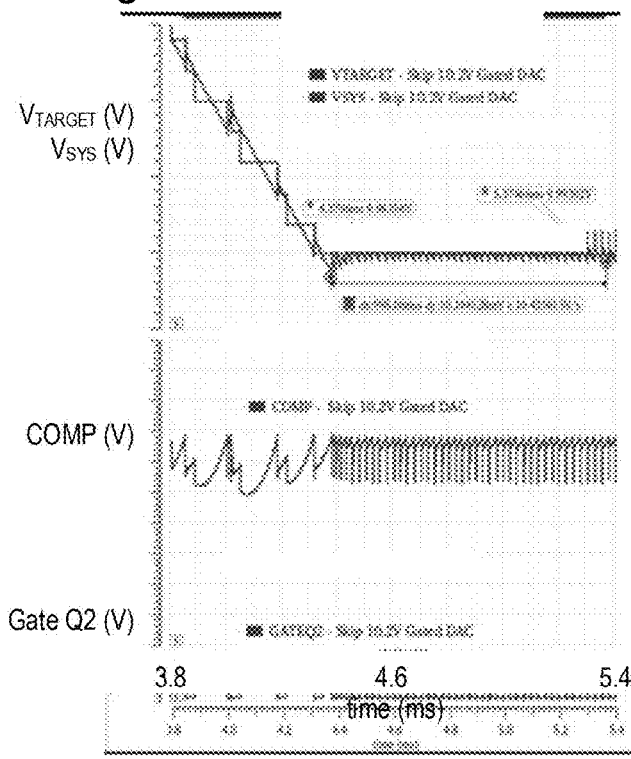
Figure 15D:
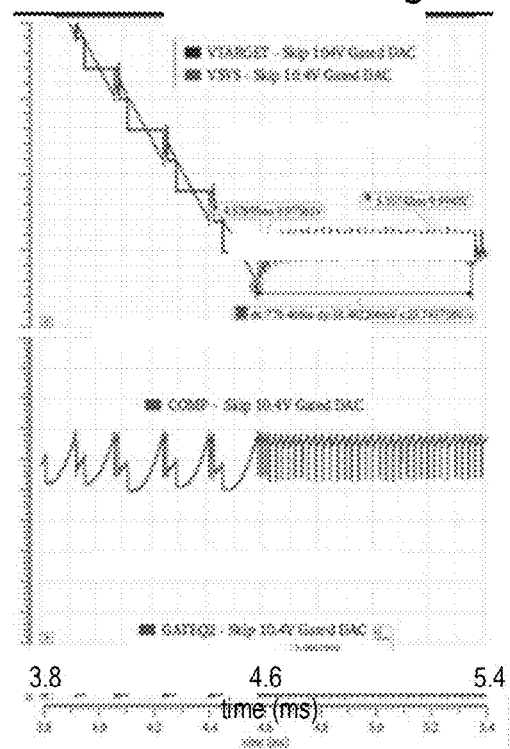

FIGS. 15B to 15D illustrates simulated DAC output voltage and target voltage, together with compensation output voltage and high-side FET gate voltage, for the power converter and DAC shown in FIG. 4, for N exceeds the number of DAC levels, N=10 and N=20 respectively under a fourth, very light-load condition.

Figure 16A:
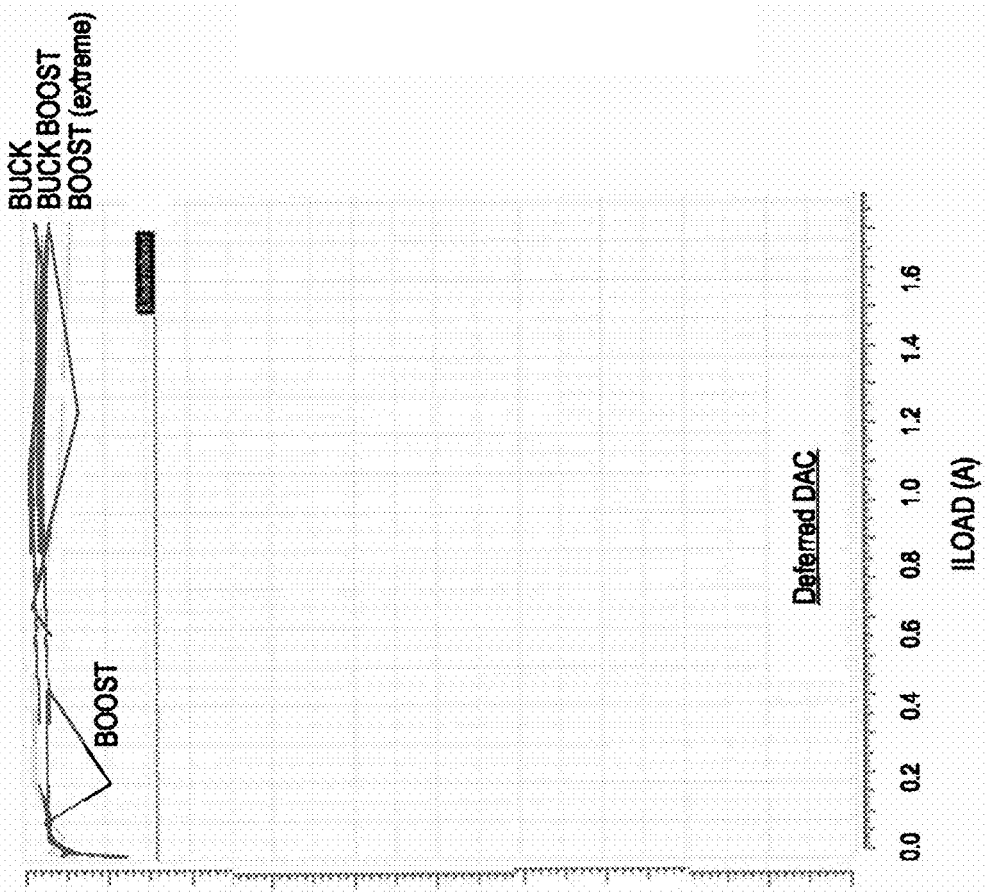
FIGS. 16A and 16B are plots of simulated undershoot voltage against current load for Buck, Boost, extreme Boost and Buck-Boost converters for a DAC shown in FIG. 1 and for a DAC shown in FIG. 4, respectively.
Figure 16B:
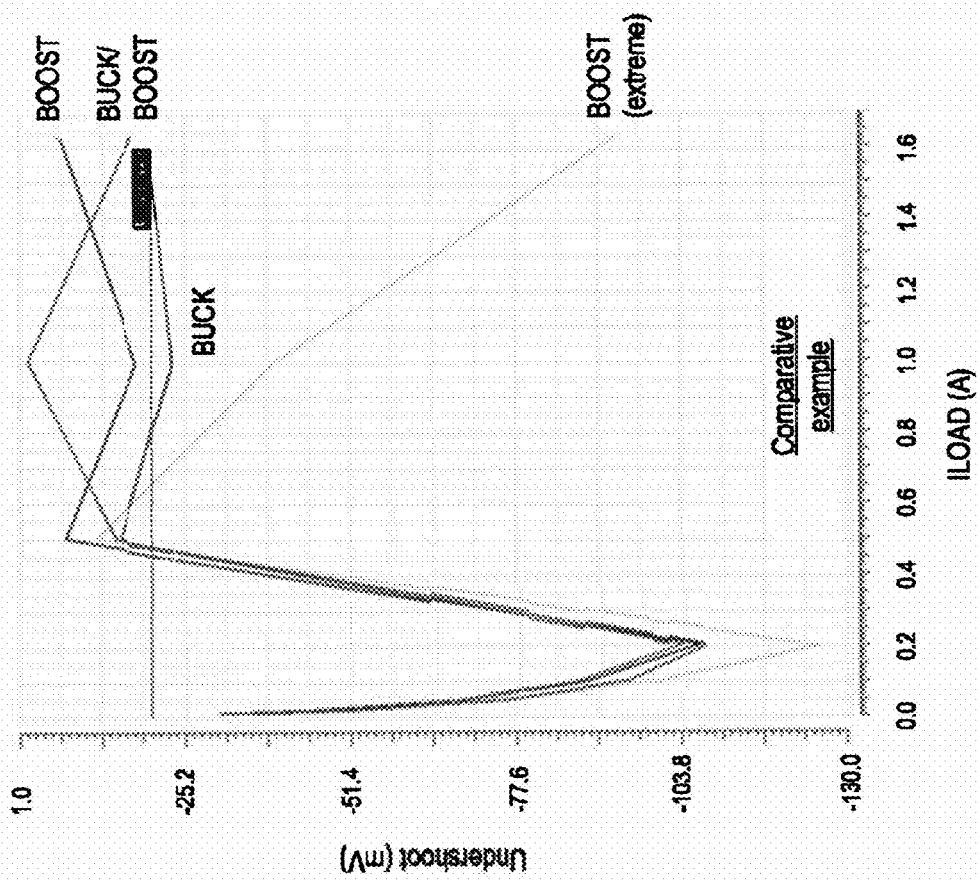

FIGS. 16A and 16B are plots of simulated undershoot voltage against current load for Buck, Boost, extreme Boost and Buck-Boost converters for a DAC shown in FIG. 1 and for a DAC shown in FIG. 4, respectively.

FIGS. 17A and 17B are tables of simulated undershoot voltage as a function of current load for Buck, Boost, extreme Boost and Buck-Boost converters for a DAC shown in FIG. 1 and for a DAC shown in FIG. 4, respectively.

Figure 18:
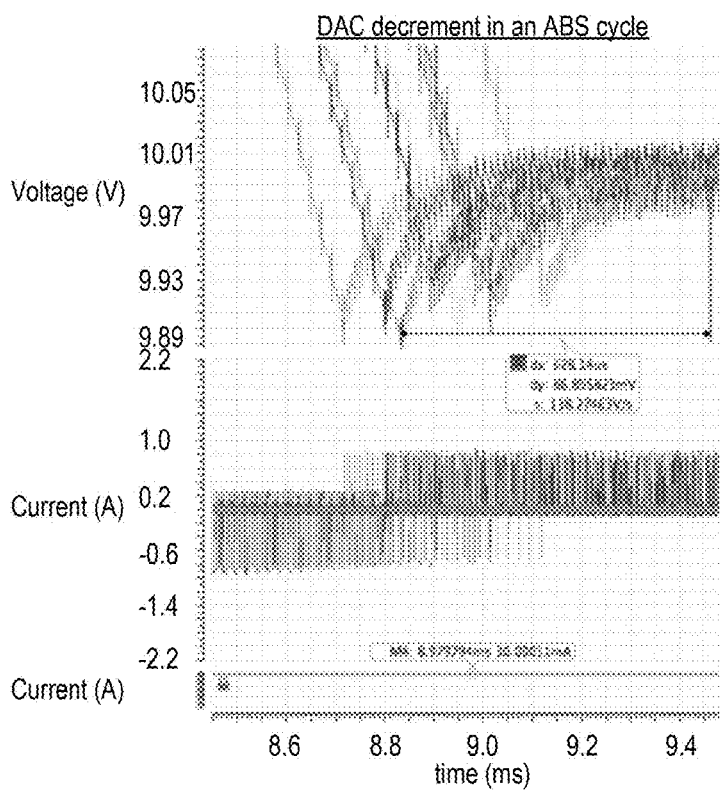
FIG. 18 illustrates simulated DAC output voltage and load current against time for an ABS cycle using a DAC shown in FIG. 1.

FIG. 18 illustrates simulated DAC output voltage and load current against time for an ABS cycle using a DAC shown in FIG. 1.

Figure 19:
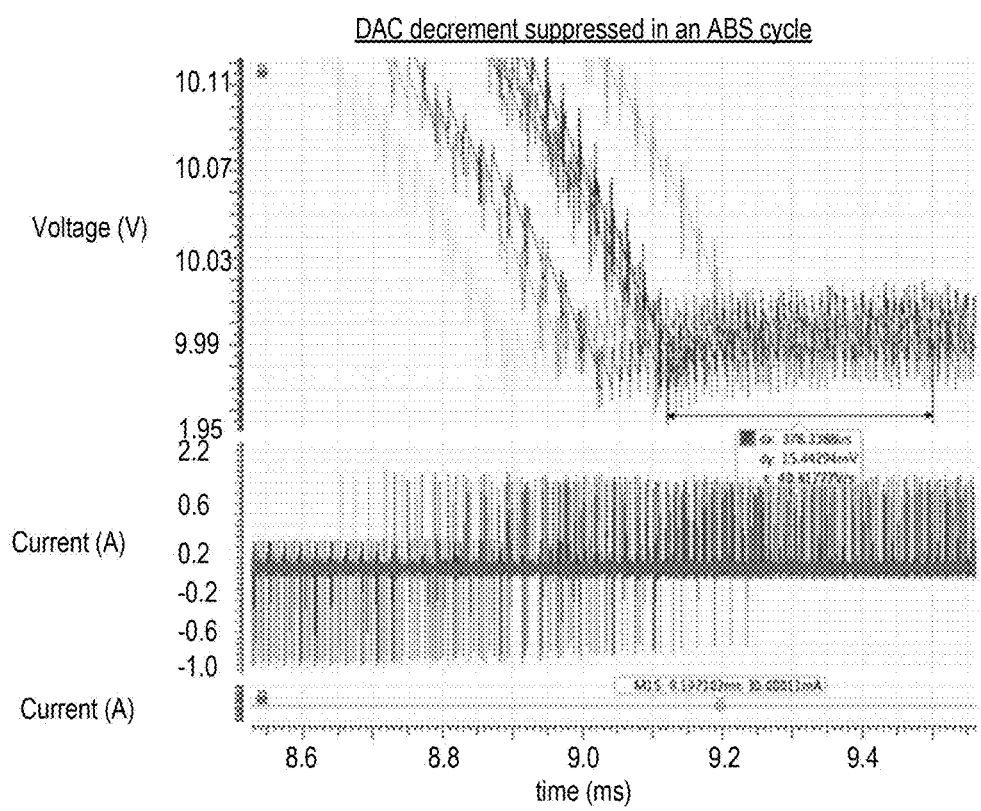
FIG. 19 illustrates simulated DAC output voltage and load current against time for an ABS cycle using a DAC shown in FIG. 7.

FIG. 19 illustrates simulated DAC output voltage and load current against time for an ABS cycle using a DAC shown in FIG. 8.

Figure 20:
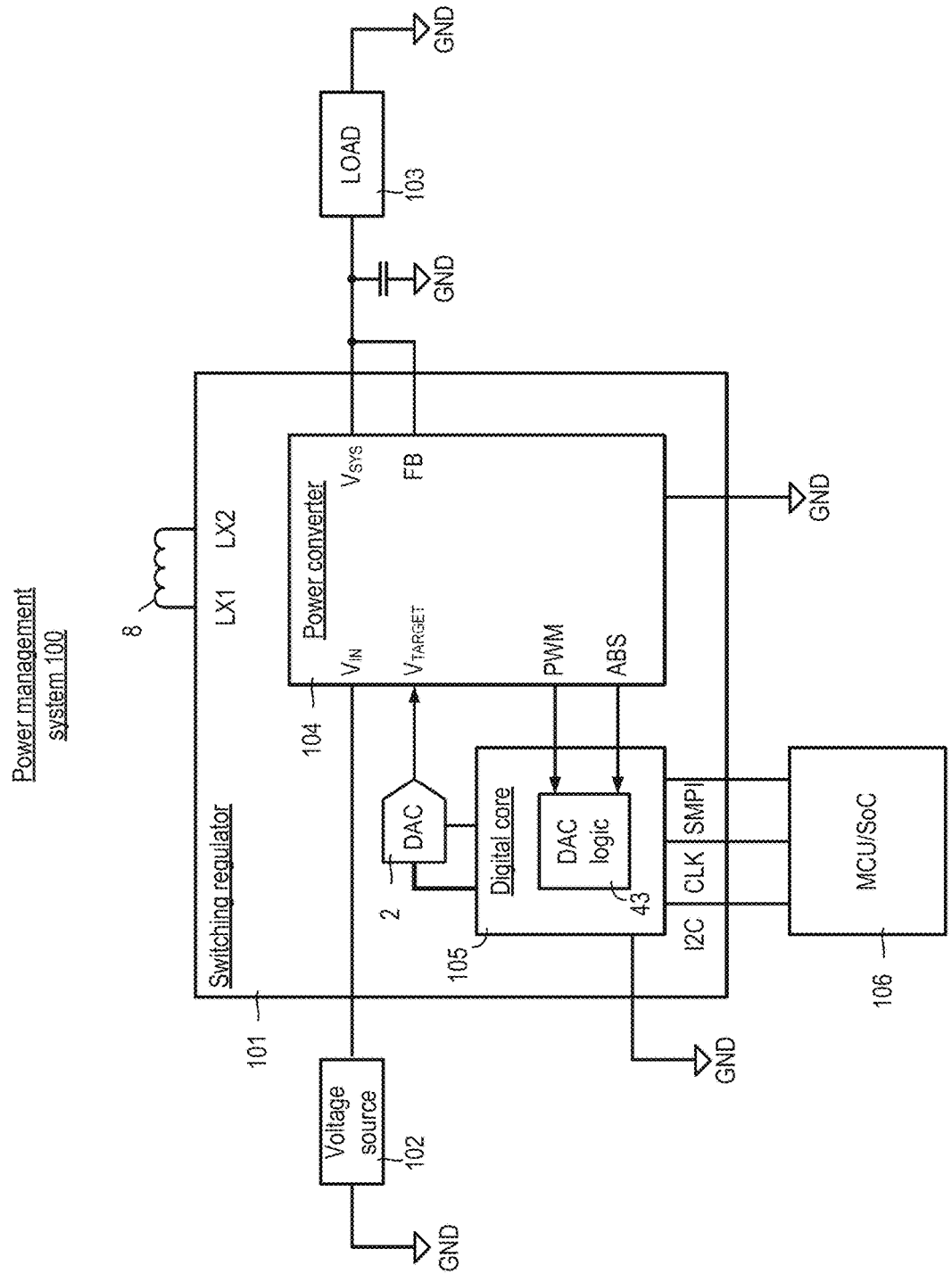
FIG. 20 is a schematic block diagram of a voltage source, switching regulator, load and a controller.

System. Referring to FIG. 20, a power management system 100 is shown.

The power management system 100 includes a switching regulator IC 101 having an off-chip inductor 8. The power management system 100 includes a power source 102, for example, a battery, and a load, 103, for example, a digital system or lighting component(s).

The switching regulator IC 101 includes the power converter 1, e.g., a Buck Boost converter, and a digital core 105. The power converter 1 includes a power stage (not shown) comprising power switches. In some cases, the power stage may be off-chip, i.e., the switching regulator may comprise the control stage (not shown).

The digital core 105 includes the DAC control 43. The digital core 105, including DAC control 43, can be controlled via I2C and SMPI bus interfaces by a host 106 for example in the form of microcontroller or system-on-a-chip (SoC). The host 106 may alco provide the clock signal CLK.

Modifications. It will be appreciated that various modifications may be made to the embodiments hereinbefore described. Such modifications may involve equivalent and other features which are already known in the design, manufacture and use of power management and component parts thereof and which may be used instead of or in addition to features already described herein. Features of one embodiment may be replaced or supplemented by features of another embodiment. Although a hardware-implemented method of controlling the DAC is described (using DAC logic implemented in hardware logic/circuits), the method can be performed in software, for example, by the MCU/SoC. Although ramp down is detected digitally, ramp down can be detected using analog detection, for example, using a differentiator. The DAC resolution may be higher, for example as high as 16 bits, or lower, for instance, as low as 5 bits or even lower. A hysteretic switching converter need not be used. The switching converter can be any form of switching converter which employs a DAC to set the output target and have a closed loop control system. The inductor (which may take the form of coil) need not be off chip.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A digital-to-analog (DAC) control logic device for controlling a DAC for supplying a target voltage VTARGET to a switching converter, the DAC control logic device comprising control logic to:

decrement, during one or more steps in a DAC ramp-down prior to a last number of one or more steps in the DAC ramp-down, a DAC input code;

determine a condition including whether a difference between a new value of the DAC input code and a current value of the DAC input code is less than or equal to a predetermined value N corresponding to the last number of steps;

wait, upon a positive determination, until at least one switching cycle has occurred before decrementing the DAC input code, decrement, upon a negative determination, the DAC input code from the current value to the new value whether or not the at least one switching cycle has occurred;

decrement, during the last number of steps during the DAC ramp-down and by deferment to a next switching cycle, the DAC input code; and decrease, during the last number of steps during the DAC ramp-down, a clock rate corresponding to the DAC, wherein a ramp-down detector is configured to identify the DAC ramp-down by determining whether a new DAC input code is less than a current DAC input code, and a calculator is configured to calculate the difference.

2. The DAC control logic device of claim 1, wherein the condition further includes whether the switching regulator is applying audio band suppression which suppresses switching below a given frequency.

3. The DAC control logic device of claim 2, wherein the control logic is configured upon the positive determination, to decrease the DAC clock rate.

4. A system, comprising:
the DAC; and
DAC logic including the DAC control logic of claim 3, the DAC logic arranged to supply the DAC input code to the DAC.

5. A monolithic integrated circuit, comprising the system of claim 4.

6. The monolithic integrated circuit of claim 5, further comprising:
the switching converter,
wherein the DAC is configured to provide the target voltage to the switching converter.

7. A method of controlling a digital-to-analog (DAC) which supplies a target voltage VTARGET to a switching regulator, the method comprising:

decrementing, during one or more steps in a DAC ramp-down prior to a last number of one or more steps in the DAC ramp-down, a DAC input code;

identifying the DAC ramp-down by determining whether a new DAC input code is less than a current DAC input code;

calculating a difference between a new value of the DAC input code and a current value of the DAC input code;

determining a condition including whether the difference is less than or equal to a predetermined value N corresponding to the last number of steps;

waiting, upon a positive determination, until the at least one switching cycle has occurred before decrementing the DAC input code; and decrementing, upon a negative determination, the DAC input code from the current value to the new value whether or not the at least one switching cycle has occurred;

decrementing, during the steps, the last number of steps during the DAC ramp-down and by deferment to a next switching cycle, the DAC input code; and decreasing, during the last number of steps during the DAC ramp-down, a clock rate corresponding to the DAC.

8. The method of claim 7, wherein the condition further includes whether the switching regulator is applying audio band suppression which suppresses switching below a given frequency.

9. The method of claim 7, further comprising:
upon the positive determination, decreasing the DAC clock rate.

* * * * *